(12) United States Patent
Kirino

(10) Patent No.: US 9,150,723 B2
(45) Date of Patent: Oct. 6, 2015

(54) CURABLE RESIN COMPOSITION

(71) Applicant: THREE BOND FINE CHEMICAL CO., LTD., Kanagawa (JP)

(72) Inventor: Manabu Kirino, Kanagawa (JP)

(73) Assignee: THREE BOND FINE CHEMICAL CO., LTD., Kanagawa (JP)

( * ) Notice: Subject to any disclaimer, the term of this patent is extended or adjusted under 35 U.S.C. 154(b) by 0 days.

(21) Appl. No.: 14/365,403

(22) PCT Filed: Dec. 11, 2012

(86) PCT No.: PCT/JP2012/082070
§ 371 (c)(1),
(2) Date: Jun. 13, 2014

(87) PCT Pub. No.: WO2013/089100
PCT Pub. Date: Jun. 20, 2013

(65) Prior Publication Data
US 2014/0329926 A1    Nov. 6, 2014

(30) Foreign Application Priority Data

Dec. 16, 2011    (JP) .................. 2011-276148

(51) Int. Cl.
| | | |
|---|---|---|
| C08F 2/50 | (2006.01) | |
| C08F 2/46 | (2006.01) | |
| C08G 61/04 | (2006.01) | |
| C08L 63/00 | (2006.01) | |
| C08G 59/66 | (2006.01) | |
| C08G 59/68 | (2006.01) | |

(52) U.S. Cl.
CPC .................. *C08L 63/00* (2013.01); *C08G 59/66* (2013.01); *C08G 59/68* (2013.01)

(58) Field of Classification Search
CPC .......... C08L 63/00; C08G 59/66; C08G 59/68
USPC .......... 522/14, 12, 15, 7, 6, 1, 71, 189, 184, 8, 522/13, 21, 22, 31, 66, 63, 25, 26, 29; 520/1
See application file for complete search history.

(56) References Cited

U.S. PATENT DOCUMENTS

| | | | |
|---|---|---|---|
| 4,369,206 A | 1/1983 | Mayer et al. | |
| 4,943,516 A | 7/1990 | Kamayachi et al. | |
| 5,204,218 A | 4/1993 | Kumada et al. | |
| 6,057,380 A | 5/2000 | Birbaum et al. | |
| 6,455,207 B1 * | 9/2002 | Katoh et al. | 430/7 |
| 2011/0028585 A1 * | 2/2011 | Shiraishi et al. | 522/63 |
| 2011/0213070 A1 | 9/2011 | Okuno et al. | |
| 2012/0095124 A1 * | 4/2012 | Kirino | 522/26 |

FOREIGN PATENT DOCUMENTS

| | | |
|---|---|---|
| CN | 102208558 A | 10/2011 |
| EP | 0555749 | 8/1993 |
| EP | 0599571 | 6/1994 |
| EP | 1291390 | 3/2003 |
| JP | 55-22669 | 2/1980 |
| JP | 04-330444 | 11/1992 |
| JP | 11-71450 | 3/1999 |
| JP | 2000-212397 | 8/2000 |
| JP | 2000-230112 | 8/2000 |
| JP | 2001-316451 | 11/2001 |
| JP | 2003-26772 | 1/2003 |
| JP | 2004-292516 | 10/2004 |
| WO | 02/051905 | 7/2002 |
| WO | 03/033500 | 4/2003 |

(Continued)

OTHER PUBLICATIONS

International Preliminary Report on Patentability for PCT/JP2012/082070, dated Jun. 26, 2014, and English Translation thereof.

(Continued)

*Primary Examiner* — Ling Choi
*Assistant Examiner* — Jessica E Whiteley
(74) *Attorney, Agent, or Firm* — Roylance, Abrams, Berdo & Goodman, L.L.P.

(57) ABSTRACT

An object of the present invention is to provide a curable resin composition capable of being quickly cured at a low temperature by irradiation of an active energy ray such as light and having excellent storage stability, and a curing method. Furthermore, in the curable resin composition of the present invention, which uses a component (D) in combination, the active energy ray curability is more improved. Provided is a curable composition containing components (A) to (C) described below:

the component (A) being a compound having 2 or more glycidyl groups in the molecule;

the component (B) being a compound having 2 or more thiol groups in the molecule; and the component (C) being a photobase generating agent containing a salt having an anion expressed by the following general formula (1);

[Chemical Formula 1]

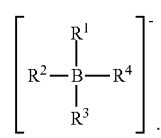

(1)

7 Claims, 1 Drawing Sheet

(56) References Cited

FOREIGN PATENT DOCUMENTS

| WO | 2009/122664 | * | 10/2009 |
| WO | 2010/052823 |   | 5/2010 |
| WO | 2010/128568 |   | 11/2010 |
| WO | 2010/147161 | * | 12/2010 |

OTHER PUBLICATIONS

Chemistry & Technology of UV & EB Formulation for Coatings, Inks & Paints, Ed. By G. Bradley, John Wiley and Sons Ltd. (1998) 479-545.

Frechet, J., The photogeneration of acid and base within polymer coatings: Approaches to polymer curing and imaging, Pure and Appl. Chem., (1992) vol. 64, No. 9, 1239-1248.

Cameron, J. et al., Base Catalysis in Imaging Materials. I. Design and Synthesis of Novel Light-Sensitive Urethanes as Photoprecursors of Amines, J. Org. Chem., (1990) 55, 5919-5922.

Frechet, J. et al., Photogenerated Amines and Diamines: Novel Curing Systems for Thin Film Coatings, Polym. Mat. Sci. Eng., (1991) 64, 55-56.

Mochizuki, A. et al., Novel Photosensitive Polyimide Precursor Based on Polyisoimide Using an Amine Photogenerator, Macromol., (1995) 28, 365-369.

Hanson, J. et al., PhotoAcid and Photo Base Generators: Arylmethyl Sulfones and Ammonium Salts, Polym. Mat. Sci. Eng., (1995) 72, 201-202.

Summary of lecture of the 13th fusion UV technique seminar, (2006) p. 41.

Yu, X. et al., Synthesis and Photoinitiation Properties of a Novel Quaternary Ammonium Tetraphenylborate Salt, J. Appl. Polym. Sci., (2006) vol. 100, 399-405.

Sun, X. et al., Bicyclic Guanidinium Tetraphenylborate: A Photobase Generator and a Photocatalyst for Living Anionic Ring-Opening Polymerization and Cross-Linking of Polymeric Materials Containing Ester and Hydroxy Groups, J. Am. Chem. Soc., (2008) vol. 130, 8130-8131.

International Search Report for PCT/JP2012/082070, dated Mar. 5, 2013.

Chinese Office Action in corresponding CN Appln. No. 201280062197.0, dated Aug. 5, 2015, and English translation thereof.

* cited by examiner

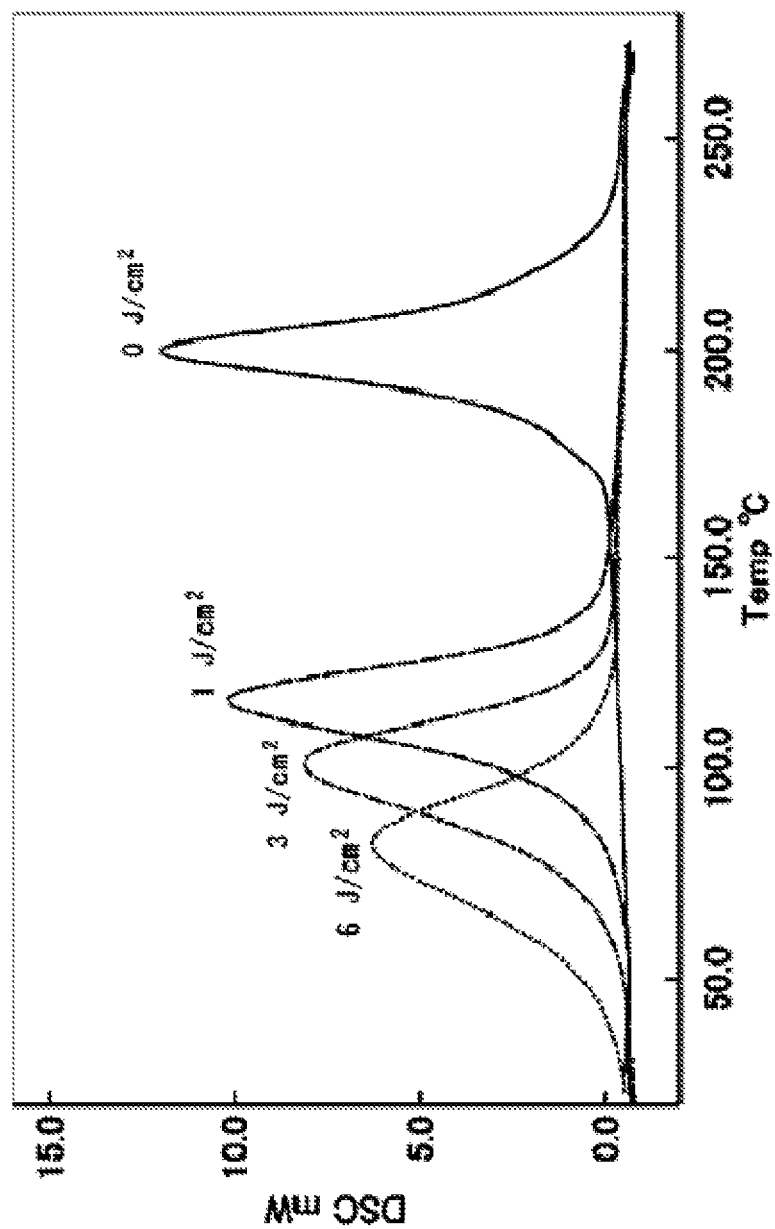

CURABLE RESIN COMPOSITION

TECHNICAL FIELD

The present invention relates to a curable composition capable of being quickly cured at room temperature or a low heating temperature by irradiation of an active energy ray, and a curing method.

BACKGROUND ART

A technique of photo-curing of a liquid resin, and the like (a technique of polymerization and curing by irradiation of an active energy ray such as ultraviolet rays) takes advantage of characteristics such as curing at a low temperature, shortening of processes, short time curing and excellent fine workability as compared to conventional thermosetting techniques, and has been widely used for an adhesive agent, a sealing agent, a coating agent, a resist agent, and the like. Curing systems that are generally used in photo-curing at present are roughly divided into the radical curing system and the cation curing system. In the case of the radical curing system, a photoradical generating agent and a (meth)acrylate resin are main components, the system has a characteristic of quickly curing after light irradiation but has problems such as having generally low adhesion strength, large curing contraction and poor heat resistance. On the other hand, the cation curing system is constituted of a photo-acid forming agent such as diaryl iodonium salt and a triaryl sulfonium salt, and an epoxy resin, an oxetane resin, a vinyl ether resin, or the like, which has a cation polymerization property, and the photo-acid forming agent generates an acid in light irradiation to make a cation polymerizable resin cured. In the case of cation curing, the system has characteristics such as quick curing property, high adhesion strength and low curing contraction, but has problems such as generating curing defect due to moisture or a subtle basic stain in the surface of an adherent and causing erosion when the system is used for an adherent made of a metal or an inorganic material since a strong acid remains in the system.

As one means for solving such problems of the cation curing system, a study of anion curing by a photobase generating agent that generates a basic compound by light irradiation has been made in recent years. As such a photobase generating agent, for example, a carbamate derivative and an oxime ester derivative have been generally known, these compounds generate primary or secondary amines by light irradiation and used for curing of an epoxy resin (Non-Patent Literature 1). A technique of generating a basic compound by light has been largely used for a photoresist technique and, in order to obtain size stability of an edge developed in a narrow line width resist, an anion polymerization type curing system having less termination reactions is largely used (Non-Patent Literature 2 and Patent Literatures 1, 2 and 3). In a technique of curing an epoxy resin by a basic compound generated by light, examples of typical basic compounds include amines, and amines are bases generated by light, which have been the most useful until today. For example, a substituted benzyl carbamate derivative generates primary and secondary amines by light irradiation, which enables a curing reaction of an epoxy compound (Non-Patent Literatures 3, 4 and 5). On the other hand, trials for photochemically generating tertiary amines have been made. Photo decomposition of a tetraalkyl ammonium salt is proposed as a method of photochemically generating tertiary amine (Non-Patent Literature 6).

Patent Literature 5 discloses a carboxylic acid ammonium salt, Patent Literature 6 discloses an α-aminoacetophenone derivative, Patent Literature 7 discloses an aromatic amineimide compound, Patent Literature 8 discloses a composition containing an amineimide compound, singlet•triplet sensitizing agents, and an epoxy resin. Further, Patent Literature 9 reports a system in which α-aminoacetophenones are present as a compound that effectively generates tertiary amine, and tertiary amine is more effectively generated after light irradiation in an addition curing reaction of an epoxy resin obtained by combining the compound and a hydrogen-drawing type radical initiator reacted with polyvalent thiol compounds to thus cure a resin. What is more, Patent Literature 10 and Non-Patent Literature 7 report curing of an epoxy resin by a compound that generates amidines by light, and a composition made of an epoxy resin and a thiol compound. Other than these compounds, a salt compound of quaternary ammonium and tetraphenyl borate (Non-Patent Literature 8), a salt compound of triazabicyclodecene and tetraphenyl borate (Non-Patent Literature 9), and the like, were reported as a photobase generating agent.

As described above, there are a large number of reported examples of techniques of generating a basic compound by light and such techniques have very high usefulness as a polymerization (curing) initiation system in curing an epoxy resin, in particular. However, in a photobasic generation system that has been reported so far, particularly in a system of generating tertiary amine, the generation efficiency is not very high and the system has a defect such that light irradiation for a long time is necessary to sufficiently generate amines. In the inventions described in the Patent Literatures 5 and 6, generation efficiency of tertiary amine to be generated is high but the generated tertiary amine has a low ability of catalytic activity and does not make an epoxy resin cured.

On the other hand, systems described in Patent Literature 7, Patent Literature 8, Non-Patent Literature 8 and Non-Patent Literature 9 are considered to be more useful for generating tertiary amine, but in fact, a time until an epoxy resin reaches complete curing is very long and the systems do not attain giving sufficient photo-curability to the epoxy resin. Patent Literature 9 discloses a composition made of an epoxy resin, a thiol compound and a photoanionic initiator, but the composition also does not have an ability of curing an epoxy resin quickly after completion of light irradiation.

Patent Literature 10 and Patent Literature 11 disclose curing of an epoxy resin by a compound that generates amidines having a large basic property by light as a photoanionic initiator and a composition made of an epoxy resin and a thiol compound, but do not mention specific blending compositions and how much curing speed is shown. Non-Patent Literature 7 discloses a technique of curing a composition made of an epoxy resin, polythiol and the photoanionic initiator disclosed in Patent Literature 10 in 2.5 hours after energy ray irradiation and that an optical a of the composition is more improved by thioxanthone or benzophenone, but the technique does not have a curing speed at a degree capable of curing an epoxy resin quickly after completion of light irradiation and storage stability of the composition was not also sufficient.

CITATION LIST

Patent Literatures

Patent Literature 1: EU Patent Application Publication No. 599571

Patent Literature 2: EU Patent Application Publication No. 555749
Patent Literature 3: JP-A No. H04-330444
Patent Literature 4: U.S. Pat. No. 4,943,516
Patent Literature 5: JP-A No. S55-22669
Patent Literature 6: JP-A No. H11-71450
Patent Literature 7: WO 2002/051905
Patent Literature 8: JP-A No. 2003-26772
Patent Literature 9: JP-A No. H11-071450
Patent Literature 10: WO 2003/033500
Patent Literature 11: US Patent Application Publication No. 2011/0028585

Non-Patent Literatures

Non-Patent Literature 1: Chemistry & Technology of UV & EB Formulation for Coatings, Inks & Paints, Ed. by G. Bradley, John Wiley and Sons Ltd. (1998, p 479 to p 545)
Non-Patent Literature 2: Pure and Appl. Chem., 64, 1239 (1992)
Non-Patent Literature 3: J. Org. Chem., 55, 5919 (1990)
Non-Patent Literature 4: Polym. Mat. Sci. Eng., 64, 55 (1991)
Non-Patent Literature 5: Macromol., 28, 365 (1995)
Non-Patent Literature 6: Polym. Mat. Sci. Eng., 72, 201 (1995)
Non-Patent Literature 7: Summary of lecture of the 13th fusion UV technique seminar, p. 41 (2006)
Non-Patent Literature 8: J. Appl. Polym. Sci., Vol. 100, 399 (2006)
Non-Patent Literature 9: J. Am. Chem. Soc., Chem, Vol. 130, 8130 (2008)

SUMMARY OF INVENTION

Technical Problem

An object of the present invention is to solve the above described problems, that is, to provide a curable composition capable of being cured quickly at a low temperature by irradiation of an active energy ray such as light, which can be used in various applications such as adhesion, sealing, casting, molding, painting, coating, photoetching and photoprinting, and a curing method of the curable composition.

Solution to Problem

That is, in order to achieve the object described above, inventors of the present invention conducted intensive studies, and as a result, found that the above described object can be achieved according to a specific curable composition, and the completion of present invention was thus attained. The summary of the present invention will be explained in the following.

[1] A curable composition containing components (A) to (C) described below:
the component (A) being a compound having 2 or more glycidyl groups in the molecule thereof;
the component (B) being a compound having 2 or more thiol groups in the molecule thereof; and
the component (C) being a photobase generating agent containing a salt having an anion expressed by the following general formula (1).
[2] The curable composition according to [1], wherein a photosensitizing agent (D) is further added.
[3] The curable composition according to [1] or [2], wherein the component (C) contains a salt expressed by the general formula (2) or (3) described below.
[4] The curable composition according to any one of [1] to [3], wherein the quaternary ammonium cation of $Z^+$ described above is selected from the group consisting of cations having one or more structures of 1,8-diazabicyclo[5.4.0]undeca-7-ene, 1,5-diazabicyclo[4.3.0]nona-5-ene, triazabicyclodecene, hexahydromethylpyrimidopyrimidine and tetra n-butyl ammonium, in the molecule, the alkali metal cation of $Z^+$ described above is selected from the group consisting of a sodium cation, a potassium cation and a lithium cation, and the phosphonium cation in $Z^+$ described above is a compound expressed by the formula (4) described below.
[5] The curable composition according to any one of [2] to [4], wherein the component (D) is selected from: a compound that is selected from the group consisting of compounds expressed by the general formulae (5) to (8); a radical polymerization initiator that is selected from the group consisting of a benzyl ketal-based photoradical polymerization initiator, an α-hydroxyacetophenone-based photoradical polymerization initiator, a benzoin-based photoradical polymerization initiator, an aminoacetophenone-based photoinitiator, an oxime ketone-based photoradical polymerization initiator, an acylphosphine oxide-based photoradical polymerization initiator, and the general formula (9); a nitro compound that is selected from the group consisting of a nitrobenzoic acid and a nitroaniline; an aromatic hydrocarbon that is selected from the group consisting of a naphthalene derivative and an anthracene derivative; and a dye that is selected from the group consisting of riboflavin, rose bengal, eosin, erythrosine, methylene blue and new methylene blue rose.
[6] The curable composition according to any one of [2] to [6], further containing a compound that contains one or more radical polymerizable groups in the molecule of (E).
[7] A curing method comprising: irradiating an active energy ray having a wavelength of 150 to 830 nm on the curable composition set forth in any one of [1] to [6]; thereafter curing the curable composition at room temperature or in a heating environment.

Advantageous Effect of the Invention

The curable composition of the present invention can quickly cure at room temperature or a low heating temperature by irradiation of an active energy ray such as ultraviolet rays and is also excellent in storage stability. The curable composition of the present invention that is used in combination with the component (D) further has improved curability by an active energy ray. In addition, a polymerization curing speed can be controlled as desired by optionally selecting kinds and adding amounts of the components (C), (D) and (E) and optionally selecting an irradiation amount of an active energy ray and an atmospheric temperature during irradiation. According to this characteristic, for example, the composition is not cured immediately after energy irradiation and can be then cured by being left to stand at room temperature or under heating for a short time, and by use of this characteristic, the curable composition of the present invention enables adhesion of an opaque material and curing of a part that is a shade by ultraviolet rays but a general photo-curability resin cannot. By addition of the component (E), flowability of the composition after light irradiation can be adjusted. According to these characteristics, the composition can be used in various applications such as adhesion, sealing, casting, painting, coating, photoetching and photoprinting materials.

BRIEF DESCRIPTION OF DRAWINGS

FIG. 1 is a result of measurements by a differential scanning calorimeter (DSC) when an ultraviolet accumulated light quantity of the composition in Example 8 was changed.

DESCRIPTION OF EMBODIMENTS

The present invention will be more specifically explained below.

<Component (A)>

A compound containing 2 or more glycidyl groups in the molecule, which is the component (A) in the curable composition of the present invention, may be a compound containing 2 or more glycidyl groups in the molecule in addition to generally called epoxy resins. Such a compound may also have a functional group other than glycidyl groups. Specific examples of the functional group include a hydroxyl group, an acrylic group, a methacrylic group, a vinyl group, an acetal group, an ester group, a carbonyl group, an amide group and an alkoxysilyl group. These glycidyl group-containing compounds may be used solely or in mixing two or more of these compounds.

Specific examples of the component (A) include so-called epi-bis-type liquid epoxy resins such as a diglycidyl ether derived from bisphenol A and epichlorohydrin and a derivative thereof, a diglycidyl ether derived from bisphenol F and epichlorohydrin and a derivative thereof; a glycidyl ether derived from an aliphatic/aromatic alcohol and epichlorohydrin, a glycidyl ester derived from polybasic acid and epichlorohydrin and a derivative thereof, a glycidyl ether derived from hydrogenated bisphenol A and epichlorohydrin, alicyclic epoxy such as 3,4-epoxy-6-methylcyclohexylmethyl-3, 4-epoxy-6-methylcyclohexan ecarboxylate, bis(3,4-epoxy-6-methylcyclohexylmethyl)adipate and derivatives thereof, a 5,5'-dimethyl hydantoin type epoxy resin, substituted epoxy derived from triglycidyl isocyanate or isobutylene, and a triazine skeleton-containing epoxy compound, but are not limited thereto, and among these compounds, a use of a diglycidyl ether derived from bisphenol A or bisphenol F and epichlorohydrin is preferable from the viewpoint of obtaining a composition with an excellent balance among a cost, curability, and adhesivity and physical strength of a cured product. In addition, when a polyfunctional epoxy is used, a composition excellent in curability and heat resistance of a cured product can be obtained. Furthermore, when an aliphatic or alicyclic epoxy compound is used, a composition excellent in transparency, weather resistance and flexibility of a cured product can be obtained.

Examples of a commercially available epoxy resin product include JER (former Epikote) 828, 1001, 801, 806, 807, 152, 604, 630, 871, YX8000, YX8034 and YX4000 manufactured by Mitsubishi Chemical Corporation, Epiclon 830, EXA-830LVP, EXA-850CRP, 835LV, HP4032D, 703, 720, 726 and HP820 manufactured by DIC Corporation, EP4100, EP4000, EP4080, EP4085, EP4088, EPU6, EPR4023, EPR1309 and EP49-20 manufactured by Asahi Denka Kogyo k. k., Denacol EX614B, EX411, EX314, EX201, EX212 and EX252 manufactured by Nagase ChemteX Corporation, BLEMMER CP-15, CP-30 and CP-50M and MARPROOF G-1005S manufactured by NOF CORPORATION, and TEPIC, TEPIC-S and TEPIC-VL manufactured by NISSAN CHEMICAL INDUSTRIES, LTD., but are not limited thereto. Each of these may be used solely or in mixing two or more products.

An epoxy compound of the component (A) has an epoxy equivalent of preferably from 30 to 30,000 g/eq, more preferably from 40 to 10,000 g/eq, and further more preferably from 50 to 3,000 g/eq. In addition, the epoxy equivalent means the gram number of a resin containing an epoxy group in an amount equivalent to 1 g and can be measured in accordance with JIS7236 (version in 2001).

<Component (B)>

The component (B) that is used in the present invention may be a thiol compound containing two or more thiol groups in the molecule. Specific examples thereof include trimethylolpropane tristhiopropionate (trimethylolpropane tris(3-mercaptopropionate)), pentaerythritol tetrakisthiopropionate, ethylene glycol bisthioglycolate, 1,4-butanediol bisthioglycolate, trimethylolpropane tristhioglycolate, pentaerythritol tetrakisthioglycolate, di(2-mercaptoethyl)ether, 1,4-butanedithiol, 1,5-dimercapto-3-thiapentane, 1,8-dimercapto-3,6-dioxaoctane, 1,3,5-trimercaptomethylbenzene, 4,4'-thiodibenzenethiol, 1,3,5-trimercaptomethyl-2,4,6-trimethylbenzene, 2,4,6-trimercapto-s-triazine, 2-dibutylamino-4,6-dimercapto-s-triazine, pentaerythritol tetrakis(3-mercaptopropionate), dipentaerythritolhexa-3-mercaptopropionate, a terminal thiol group-containing polyether, a terminal thiol group-containing polythioether, a thiol compound obtained by a reaction of an epoxy compound and hydrogen sulfide, and a thiol compound having a terminal thiol group, which is obtained by a reaction of a polythiol compound and an epoxy compound, but are not limited thereto. A thiol compound having 3 or more thiol groups is preferable from the viewpoint of curability.

In addition, a thiol compound can be improved in storage stability by using one having as few basic impurities as possible. Also when a thiol compound containing an aromatic ring in the molecule is used, heat resistance of a cured product can be improved, and when a secondary thiol compound is used, storage stability can be more improved.

Examples of a product as (B) of the present invention include JER MATE QX11, QX12, JER CURE QX30, QX40, QX60, QX900 and CUPCURE CP3-800 manufactured by Japan Epoxy Resins Co., Ltd., OTG, EGTG, TMTG, PETG, 3-MPA, TMTP and PETP manufactured by Yodo Kagaku Co., Ltd., TEMPIC, TMMP, PEMP, PEMP-II-20P and DPMP manufactured by SAKAI CHEMICAL INDUSTRY CO., LTD., Thiokol LP-2, LP-3 and polythiol QE-340M manufactured by Toray Fine Chemicals Co., Ltd., Karenz MTPE1, TPMB and TEMB manufactured by Showa Denko K.K., and PTMP (pentaerythritol tetrakis(3-mercaptopropionate)), which can be purchased from Aldrich reagents, but are not limited thereto. Each of these compounds may be used solely or in mixing two or more compounds.

An blending amount of the component (B) in the curable composition of the present invention is not limited to a particular range and can be added within the range of a thiol equivalent (epoxy equivalent:thiol equivalent) from 10:1 to 10:90 with respect to the epoxy equivalent of an epoxy compound in the composition, and more preferably within the range from 10:5 to 10:20. When a thiol compound is added within the above described range, a composition having more excellent balance of a curing speed, and strength and heat resistance of a cured product can be obtained. In addition, the thiol equivalent means a gram number of a resin containing a thiol group in an equivalent of 1 g and can be measured by iodimetry.

<Component (C)>

The component (C) in the curable composition of the present invention is a photobase generating agent which contains a salt made of an anion expressed by the general formula (1) and an optional cation and generates a basic compound by irradiation of an active energy ray. In addition, due to the component (C), a curable composition having excellent photo-curability and storage stability can be obtained:

[Chemical Formula 1]

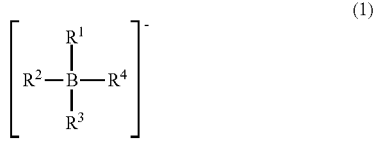

(1)

(wherein $R^1$ to $R^4$ each represents a hydrogen atom, a halogen atom, a substituted or unsubstituted aromatic group, or a substituted or unsubstituted alkyl group having 1 to 20 carbon atoms, and may be the same or different one another. Examples of the substituent include a hydrogen atom, a halogen atom, a hydroxy group (—OH), a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COO$R^p$), a carboxyl group (—COOH), an aldehyde group (—CHO), an amino group (—NH$_2$), an imino group (=NH), an amide group (—CON$R^p R^q$), an imide group (—CON$R^p$CO$R^q$), a cyano group (—CN), a sulfonic acid group (—SO$_3$H), a sulfonyl group (—SO$_2 R^p$), a nitro group (—NO$_2$), a sulfide group (—S—$R^p$), a thiol group (—SH), and an isocyanate group (—N=C=O) solely or a group obtained by mixing a plurality of any of the groups. In this case, $R^p$ and $R^q$ each independently represents a substituted or unsubstituted alkyl group having 1 to 20 carbon atoms or a substituted or unsubstituted aryl group having 6 to 20 carbon atoms).

Examples of the halogen atom in the formula (1) include a fluorine atom, a chlorine atom, a bromine atom or an iodine atom. An example of the aromatic group includes an aromatic group having 6 to 20 carbon atoms and, for example, such an aromatic group is derived from a benzene ring, a naphthalene ring or an anthracene ring.

The alkyl group having 1 to 20 carbon atoms may be either a linear alkyl group or a branched alkyl group and is not particularly limited, and examples thereof include a methyl group, an ethyl group, an n-propyl group, an isopropyl group, an n-butyl group, an isobutyl group, a sec-butyl group, a tert-butyl group, an n-pentyl group, an isopentyl group, a tert-pentyl group, a neopentyl group, a 1,2-dimethylpropyl group, an n-hexyl group, an isohexyl group, a 1,3-dimethylbutyl group, a 1-isopropylpropyl group, a 1,2-dimethylbutyl group, an n-heptyl group, a 1,4-dimethylpentyl group, a 3-ethylpentyl group, a 2-methyl-1-isopropylpropyl group, a 1-ethyl3-methylbutyl group, an n-octyl group, a 2-ethylhexyl group, a 3-methyl-1-isopropylbutyl group, a 2-methyl-1-isopropyl group, a 1-t-butyl-2-methylpropyl group, an n-nonyl group, a 3,5,5-trimethylhexyl group, an n-decyl group, an isodecyl group, an n-undecyl group, a 1-methyldecyl group, an n-dodecyl group, an n-tridecyl group, an n-tetradecyl group, an n-pentadecyl group, an n-hexadecyl group, an n-heptadecyl group, an n-octadecyl group and an n-nonadecyl group. Among these groups, a linear or branched alkyl group having 1 to 8 carbon atoms is preferable, and a methyl group, an ethyl group, an n-hexyl group and an n-octadecyl group are more preferable.

An alkyl group that could be contained as a substituent is the same as the alkyl group described above.

The aryl group having 6 to 20 carbon atoms is not particularly limited, and examples thereof include a phenyl group, a naphthyl group, a biphenyl group, a fluorenyl group, an anthryl group, a pyrenyl group, an azulenyl group, an acenaphthylenyl group, a terphenyl group, and a phenanthryl group. Among these groups, a phenyl group, a biphenyl group and a fluorenyl group are preferable and a phenyl group and a fluorenyl group are more preferable.

The alkoxy group having 1 to 20 carbon atoms may be either a linear or branched alkoxy group and is not particularly limited, and examples thereof include a methoxy group, an ethoxy group, an n-propoxy group, an isopropoxy group, an n-butyloxy group, an isobutyloxy group, a sec-butyloxy group, a tert-butyloxy group, an n-pentyloxy group, an isopentyloxy group, a tert-pentyloxy group, a neopentyloxy group, a 1,2-dimethylpropoxy group, an n-hexyloxy group, an isohexyloxy group, a 1,3-dimethylbutoxy group, a 1-isopropylpropoxy group, a 1,2-dimethylbutoxy group, an n-heptyloxy group, a 1,4-dimethylpentyloxy group, a 3-ethylpentyloxy group, a 2-methyl-1-isopropylpropyloxy group, a 1-ethyl-3-methylbutoxy group, an n-octyloxy group, a 2-ethylhexyloxy group, a 3-methyl-1-isopropylbutoxy group, a 2-methyl-1-isopropyloxy group, a 1-t-butyl-2-methylpropyloxy group, an n-nonyloxy group, a 3,5,5-trimethylhexyloxy group, an n-decyloxy group, an isodecyloxy group, an n-undecyloxy group, a 1-methyldecyloxy group, an n-dodecyloxy group, an n-tridecyloxy group, an n-tetradecyloxy group, an n-pentadecyloxy group, an n-hexadecyloxy group, an n-heptadecyloxy group, an n-octadecyloxy group and an n-nonadecyloxy group. Among these groups, a linear or branched alkoxy group having 1 to 8 carbon atoms is preferable, and a methoxy group, an ethoxy group, an n-hexyloxy group and an n-octadecyloxy group are more preferable.

A cycloalkyl group having 3 to 20 carbon atoms is not particularly limited, and examples thereof include a cyclopropyl group, a cyclobutyl group, a cyclopentyl group, a cyclohexyl group, a cycloheptyl group, a cyclooctyl group, a cyclononyl group, a cyclodecyl group, a norbornyl group, an adamantyl group, an isobornyl group, a tricyclodecyl group and a decahydronaphthyl group. Among these groups, a cycloalkyl group having 5 to 15 carbon atoms is preferable, and a cyclopentyl group, a cyclohexyl group and an adamantyl group are more preferable. $R^p$ and $R^q$ each represents a substituted or unsubstituted alkyl group having 1 to 20 carbon atoms or a substituted or unsubstituted aryl group having 6 to 20 carbon atoms. An example of a substituent with which the alkyl group or the aryl group is replaced includes an alkyl group having 1 to 10 carbon atoms.

Examples of an ester group (alkoxycarbonyl group) (—COO$R^p$) include a methyloxycarbonyl group, an ethyloxycarbonyl group, a butyloxycarbonyl group, an octyloxycarbonyl group and a dodecyloxycarbonyl group, a phenyloxycarbonyl group and a naphthyloxycarbonyl group.

Examples of an amide group (alkylaminocarbonyl group or arylaminocarbonyl group) (—CON$R^p R^q$) include a methylaminocarbonyl group, an ethylaminocarbonyl group, an n-propylaminocarbonyl group, an n-butylaminocarbonyl group, a sec-butylaminocarbonyl group, an n-pentylaminocarbonyl group, an n-hexylaminocarbonyl group, an n-heptylaminocarbonyl group, an n-octylaminocarbonyl group, a 2-ethylhexylaminocarbonyl group, a dimethylaminocarbonyl group, a diethylaminocarbonyl group, a di-n-propylaminocarbonyl group, a di-n-butylaminocarbonyl group, a di-sec-butylaminocarbonyl group, a di-n-pentylaminocarbonyl group, a di-n-hexylaminocarbonyl group, a di-n-heptylaminocarbonyl group and a di-n-octylaminocarbonyl group and a methylaminocarbonyl.

Examples of an imide group (acylalkylaminocarbonyl group) (—CON$R^p$CO$R^q$) include an acetylmethylaminocarbonyl group, an ethylcarbonylmethylaminocarbonyl group, a propylcarbonylmethylaminocarbonyl group, a butylcarbonylmethylaminocarbonyl group, a pentylcarbonylmethylaminocarbonyl group, a hexylcarbonylmethylaminocarbonyl group and a benzoylmethylaminocarbonyl group.

Examples of a sulfonyl group (alkylsulfonyl group or aryl sulfonyl group) ($-SO_2R^p$) include a methylsulfonyl group, an ethylsulfonyl group, a hexylsulfonyl group and a phenylsulfonyl group.

Examples of a sulfide group (alkylthio group or arylthio group) ($-S-R^p$) include a methylthio group, an ethylthio group, a t-butylthio group, a tert-butylthio group and a 2-methyl-1-ethylthio group.

For the component (C), a compound expressed by the general formula (2) or the general formula (3) is preferably used from the viewpoint of more excellent photo-curability:

[Chemical Formula 2]

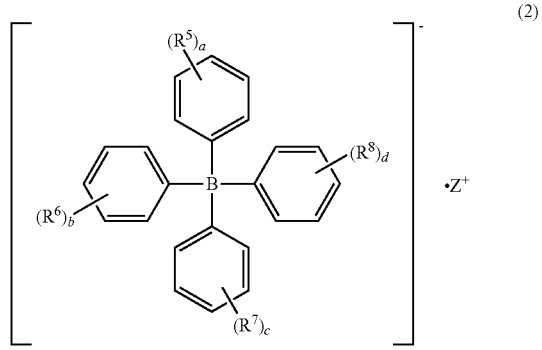

(2)

wherein $R^5$ to $R^8$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group ($-COOR^p$), a carboxyl group ($-COOH$), an aldehyde group ($-CHO$), an amino group, an imino group, an amide group ($-NH_2$), an imide group ($=NH$), a cyano group ($-CN$), a sulfonic acid group ($-SO_3H$), a sulfonyl group ($-SO_2R^p$), a nitro group ($-NO_2$), a sulfide group ($-S-R^p$), a thiol group ($-SH$), and an isocyanate group ($-N=C=O$) solely or a group obtained by mixing a plurality of any of the groups, and may be the same or different one another (wherein $R^p$ and $R^q$ each independently represents a substituted or unsubstituted alkyl group having 1 to 20 carbon atoms or a substituted or unsubstituted aryl group having 6 to 20 carbon atoms), $Z^+$ represents a quaternary ammonium cation, an alkali metal cation or a phosphonium cation, and a to d each independently represents an integer of 0 to 4;

[Chemical Formula 3]

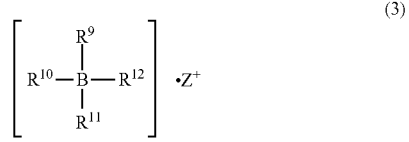

(3)

wherein $R^9$ to $R^{11}$ each represents a hydrogen atom, a halogen atom, a substituted or unsubstituted aromatic group or a substituted or unsubstituted alkyl group having 1 to 20 carbon atoms, $R^{12}$ represents an alkyl group having 1 to 20 carbon atoms, examples of the above described substituent include a hydrogen atom, a halogen atom, a hydroxyl group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group ($-COOR^a$), a carboxyl group ($-COOH$), an aldehyde group ($-CHO$), an amino group ($-NH_2$), an imino group ($=NH$), an amide group ($-CONR^pR^q$), an imide group ($-CONR^pCOR^q$), a cyano group ($-CN$), a sulfonic acid group ($-SO_3H$), a sulfonyl group ($-SO_2R^p$), a nitro group ($-NO_2$), a sulfide group ($-S-R^p$), a thiol group ($-SH$) and an isocyanate group ($-N=C=O$) solely or a group obtained by mixing a plurality of any of the groups (wherein $R^p$ and $R^q$ each independently represents a substituted or unsubstituted alkyl group having 1 to 20 carbon atoms or a substituted or unsubstituted aryl group having 6 to 20 carbon atoms), and $Z^+$ represents a quaternary ammonium cation, an alkali metal cation or a phosphonium cation.

In the formula (3), $R^9$ to $R^{11}$ each preferably represents a substituted or unsubstituted aromatic group, $R^{12}$ preferably represents an alkyl group having 1 to 20, and $Z^+$ preferably represents a quaternary ammonium cation, an alkali metal cation or a phosphonium cation.

Each of substituents in $R^5$ to $R^{12}$ in the above described formulae (2) and (3) is the same as each of the substituents in the above described general formula (1) and the explanation is therefore omitted.

Furthermore, in the general formulae (2) and (3), the above described quaternary ammonium cation of $Z^+$ is selected from the group consisting of cations each having, in the molecule, one or more of any structure of 1,8-diazabicyclo[5.4.0]undeca-7-ene, 1,5-diazabicyclo[4.3.0]nona-5-ene, triazabicyclodecene, hexahydromethylpyrimidopyrimidine, tetra n-butyl ammonium and 2-ethyl-4-methylimidazole, the above described alkali metal cation of $Z^+$ is selected from the group consisting of a sodium cation, a potassium cation and a lithium cation, or the above described phosphonium cation of $Z^+$ is a compound expressed by the general formula (4) below:

[Chemical Formula 4]

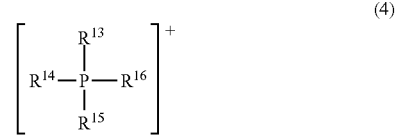

(4)

wherein $R^{13}$ to $R^{16}$ each represents a hydrogen atom, a halogen atom, a substituted or unsubstituted aromatic group or a substituted or unsubstituted alkyl group having 1 to 20 carbon atoms, and may be the same or different one another.

In the formula (4), the aromatic group is an aromatic group having 6 to 20 carbon atoms and, for example, such an aromatic group is derived from a benzene ring, a naphthalene ring and an anthracene ring. Each of the substituents in the above described general formula (4) is the same as each of the substituents of the above described formula (1) and the explanation is therefore omitted.

The phosphonium cation of $Z^+$ is preferably a benzyltriphenyl phosphonium, a tetrabutyl phosphonium, tri-tert-butyl phosphonium, di-tert-butylmethyl phosphonium or a cation expressed by the formula (4)' described below:

[Chemical Formula 5]

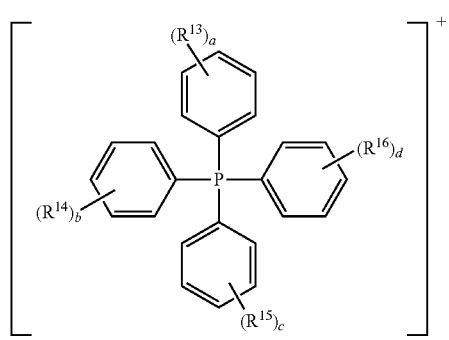

wherein $R^{13}$ to $R^{16}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—$COOR^a$), carboxyl group (—COOH), an aldehyde group (—CHO), an amino group (—$NH_2$), an imino group (=NH), an amide group (—$CONR^pR^q$), an imide group (—$CONR^pCOR^q$), a cyano group (—CN), a sulfonic acid group (—$SO_3H$), a sulfonyl group (—$SO_2R^p$), a nitro group (—$NO_2$), a sulfide group (—S—$R^p$), a thiol group (—SH) and an isocyanate group (—N=C=O) solely or a group obtained by mixing a plurality of any of the groups, and may be the same or different one another (wherein $R^p$ and $R^q$ each independently represents a substituted or unsubstituted alkyl group having 1 to 20 carbon atoms or a substituted or unsubstituted aryl group having 6 to 20 carbon atoms), $Z^+$ represents a quaternary ammonium cation, an alkali metal cation or a phosphonium cation), and a to d each independently represents an integer of 0 to 4.

In the present invention, $Z^+$ is selected from the group consisting of quaternary ammonium cations each having, in the molecule, one or more of any structure of 1,8-diazabicyclo[5.4.0]undeca-7-ene, 1,5-diazabicyclo[4.3.0]nona-5-ene, triazabicyclodecene, hexahydromethylpyrimidopyrimidine, tetra n-butyl ammonium and 2-ethyl-4-methylimidazole, and is preferably an alkali metal cation selected from the group consisting of a sodium cation, a potassium cation and a lithium cation or a phosphonium cation expressed by the general formula (4) described below, and when $Z^+$ is such a cation described above, photo activity is high and the effect of the present invention is thus more exerted.

Specific compounds for the component (C) in the curable composition of the present invention include compounds having phosphonium cations such as tetraphenyl phosphonium tetraphenyl borate, tetraphenyl phosphonium tetra-p-tolyl borate, benzyltriphenyl phosphonium tetraphenyl borate, p-tolyltriphenyl phosphonium tetra-p-tolyl borate, tri-tert-butyl phosphonium tetraphenyl borate, di-tert-butylmethyl phosphonium tetraphenyl borate, tetraphenyl phosphonium tetra-p-tolyl borate and tetrabutyl phosphonium tetraphenyl borate; compounds having alkali metal cations such as a tetraphenyl borate sodium salt and a tetraphenyl borate potassium salt; and compounds having ammonium cations such as 2-ethyl-4-methylimidazolium tetraphenyl borate, 1-8-diazabicyclo[5.4.0]undeca-7-ene-tetraphenyl borate, 1,5-diazabicyclo[4.3.0]nona-5-ene-tetraphenyl borate, tetrabutyl ammonium tetraphenyl borate, tetrabutyl ammonium-butyltriphenyl borate, tetrabutyl ammonium-butyltri-1-naphthalenyl borate, but are not limited thereto. Examples of commercially available products of these compounds include U-CAT5002, PBG-SA1, PBG-SA2 and PBG-SA1BU (manufactured by SAN-APRO LTD.); DBN-K, EMZ-K, TPP-K, TPPZ-K, TPTP-MK and TPP-MK (manufactured by HOKKO CHEMICAL INDUSTRY CO., LTD.); and P3B, BP3B, N3B and MN3B (manufactured by Showa Denko K.K.). The component (C) can also be synthesized by use of compounds disclosed in Patent Literature 11, which satisfy the requirement of the component (C) of the present invention and known methods such as the methods described in Non-patent Literatures 8 and 9, and so on. The component (C) can be used solely or also in a combination use of a plurality of compounds in the present invention.

A blending amount of the component (C) in the curable composition of the present invention is not particularly limited, and is preferably within the range from 0.001 to 30 parts by mass with respect to 100 parts by mass of the total amount of the above described component (A) and the component (B), more preferably from 0.01 to 15 parts by mass, further more preferably from 0.1 to 10 parts by mass, and particularly preferably from 0.3 to 5 parts by mass. When the component (C) is added within the above described range, a curable composition that has a balance between a curing speed and strength of a cured product and is excellent in storage stability, and the like, can be obtained. When the component (C) is less than 0.001 parts by mass, efficient photo-curability cannot be imparted to the curable composition of the present invention, and when the component (C) exceeds 30 parts by mass, there is a fear of giving an adverse effect to storage stability and various physical properties in addition that the component (C) is hardly dissolved in the component (A).

In addition, the component (C) in the curable composition of the present invention can be improved in compatibility with the component (A) and the component (B) by being diluted with a solvent. The solvent is not particularly limited as long as it dissolves the component (C), and specific examples include water, alcohols, ketones, esters, ethers, hydrocarbons and halogenated hydrocarbons. Examples of the alcohols include methanol, ethanol and propanol. Examples of the ketones include acetone, methyl ethyl ketone, and methyl isobutyl ketone. Examples of the esters include ethyl acetate, propyl acetate and butyl acetate. Examples of the ethers include diethyl ether, dibutyl ether and diethylene glycol monomethyl ether. Examples of the hydrocarbons include pentane, cyclopentane, hexane, cyclohexane, heptane and toluene. Examples of the halogens include Freon-113, trichloroethylene, 1,1,1-trichloroethane, 1,1,2,2-tetrafluoroethyl-2,2,2-trifluoroethyl ether and 3,3-dichloro-1,1,1,2,2-pentafluoropropane. Among these substances, solvents such as ketones, esters and hydrocarbons are preferable from the viewpoint of preferable solubility with the component (C). Solvents can be used solely or also in mixing two or more of them.

<Component (D)>

A photosensitizing agent can also be added to the curable composition of the present invention as the component (D). The photosensitizing agent may be a compound that enhances the activity of the composition to light by combining with the component (C), and kinds of various sensitizing mechanisms such as energy transfer, electron transfer and proton transfer do not matter. In particular, compounds expressed by the general formulae (5) to (8), a radical polymerization initiator, an aromatic hydrocarbon, a nitro compound, a dye are preferable from the viewpoint of having compatibility with the component (C) and being excellent in photo-curability.

In the curable composition of the present invention, the component (D) is specifically preferably a compound selected from the group consisting of compounds expressed by the general formulae (5) to (8); a radical polymerization initiator selected from the group consisting of a benzyl ketal-based photoradical polymerization initiator, an α-hydroxyacetophenone-based photoradical polymerization initiator, a benzoin-based photoradical polymerization initiator, an aminoacetophenone-based photoinitiator, an oxime ketone-based photoradical polymerization initiator, an acylphosphine oxide-based photoradical polymerization initiator, and general formula (9); an aromatic hydrocarbon selected from the group consisting of a naphthalene derivative and an anthracene derivative; a nitro compound selected from the group consisting of nitrobenzoic acid and nitroaniline; or a dye selected from the group consisting of riboflavin, rose bengal, eosin, erythrosine, methylene blue and new methylene blue.

Note that details of respective substituents prescribed by the general formulae (5) to (9) and the general formulae (i) to (iii) are the same as the formula (1) described above and therefore omitted.

Examples of a compound expressed by the general formula (5) include 9-fluorenone, 2-hydroxy-9-fluorenone and 2-amino-9-fluorenone:

[Chemical Formula 6]

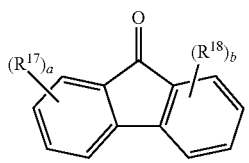

(5)

wherein $R^{17}$ and $R^{18}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group (—COOH), an aldehyde group (—CHO), an amino group (—NH$_2$), an imino group (=NH), an amide group (—CONR$^p$R$^q$), an imide group (—CONR$^p$COR$^q$), a cyano group (—CN), a sulfonic acid group (—SO$_3$H), a sulfonyl group (—SO$_2$R$^p$), a nitro group (—NO$_2$), a sulfide group (—S—R$^p$), a thiol group (—SH) and an isocyanate group (—N=C=O) solely or a group obtained by mixing a plurality of any of the groups, and may be the same or different each other (wherein $R^p$ and $R^q$ each independently represents a substituted or unsubstituted alkyl group having 1 to 20 carbon atoms or a substituted or unsubstituted aryl group having 6 to 20 carbon atoms), and a and b each independently represents an integer of 0 to 4.

In the formula (5), $R^{17}$ and $R^{18}$ each is preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms and amino group, and more preferably selected from a hydrogen atom, a hydroxy group and an amino group.

Examples of a compound expressed by the general formula (6) include anthrone and dibenzosuberone:

[Chemical Formula 7]

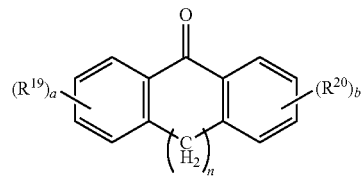

(6)

wherein n represents an integer of 1 to 12, $R^{19}$ and $R^{20}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group, a carboxyl group, an aldehyde group, an amino group, an imino group, an amide group (—CONR$^p$R$^q$), an imide group (—CONR$^p$COR$^q$), a cyano group, a sulfonic acid group (—SO$_3$H), a sulfonyl group (—SO$_2$R$^p$), a nitro group, a sulfide group (—S—R$^p$), a thiol group, and an isocyanate group solely or a group obtained by mixing a plurality of any of the groups, and may be the same or different each other (wherein $R^p$ and $R^q$ each independently represents a substituted or unsubstituted alkyl group having 1 to 20 carbon atoms or a substituted or unsubstituted aryl group having 6 to 20 carbon atoms), and a and b each independently represents an integer of 0 to 4.

In the formula (6), $R^{19}$ and $R^{20}$ is preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms and an amino group, more preferably selected from a hydrogen atom, a hydroxy group and an amino group, and further more preferably a hydrogen atom. In addition, n is preferably from 1 to 5, more preferably from 1 to 3, and further more preferably 1 or 2.

Examples of a compound expressed by the general formula (7) include fluorene, 2-bromofluorene, 9-bromofluorene, 9,9-dimethylfluorene, 2-fluorofluorene, 2-iodofluorene, 2-fluoreneamine, 9-fluorenol, 2,7-dibromofluorene, 9-aminofluorene hydrochloride, 2,7-diaminofluorene, 9,9'-spirobi[9H-fluorene], 2-fluorenecarboxyaldehyde, 9-fluorenyl methanol and 2-acetylfluorene:

[Chemical Formula 8]

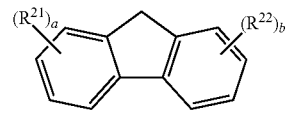

(7)

wherein $R^{21}$ and $R^{22}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group, an aldehyde group, an amino group, an imino group, an amide group (—CONR$^p$R$^q$), an imide group (—CONR$^p$COR$^q$), a cyano group, a sulfonic acid group (—SO$_3$H), a sulfonyl group (—SO$_2$R$^p$), a nitro group, a sulfide group (—S—R$^p$), a thiol group and an isocyanate group solely or a group obtained by mixing a plurality of any of the groups (wherein $R^p$ and $R^q$ each independently represents a substituted or unsubstituted alkyl group having 1 to 20 carbon atoms or a substituted or unsubstituted aryl group having 6 to 20 carbon atoms), but are not limited thereto, and a and beach independently represents an integer of 0 to 4.

In the formula (7), $R^{21}$ and $R^{22}$ is preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 6 to 20 carbon atoms and an amino group, more preferably selected from a hydrogen atom, a hydroxy group and an amino group, and further more preferably a hydrogen atom.

An example of a compound expressed by the general formula (8) includes fluoranthene:

[Chemical Formula 9]

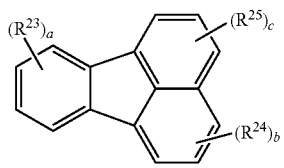

(8)

wherein $R^{23}$ to $R^{25}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—$COOR^p$), a carboxyl group, an aldehyde group, an amino group, an imino group, an amide group (—$CONR^pR^q$), an imide group (—$CONR^pCOR^q$), a cyano group, a sulfonic acid group (—$SO_3H$), a sulfonyl group (—$SO_2R^p$), a nitro group, a sulfide group (—S—$R^p$), a thiol group and an isocyanate group solely or a group obtained by mixing a plurality of any of the groups (wherein $R^p$ and $R^q$ each independently represents a substituted or unsubstituted alkyl group having 1 to 20 carbon atoms or a substituted or unsubstituted aryl group having 6 to 20 carbon atoms), but are not limited thereto, and a each independently represents an integer of 0 to 4, and b and c each independently represents an integer of 0 to 3.

In the formula (8), $R^{23}$ to $R^{25}$ each is preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms and an amino group, more preferably selected from a hydrogen atom, a hydroxy group and an amino group, and further more preferably a hydrogen atom.

Examples of a photoradical polymerization initiator used for the component (D) in the present invention include an intramolecular cleavage type photoradical polymerization initiator and a hydrogen-drawing type photoradical polymerization initiator. An intramolecular cleavage type photoradical polymerization initiator used as the component (D) is a radical initiator that is a type of generating a radical by cleavage of the compound due to irradiation of an active energy ray, and specific examples thereof include a benzyl ketal-based photoradical polymerization initiator, an α-hydroxyacetophenone-based photoradical polymerization initiator, a benzoin-based photoradical polymerization initiator, an aminoacetophenone-based photoinitiator, an oxime ketone-based photoradical polymerization initiator, an acylphosphine oxide-based photoradical polymerization initiator, a titanocene-based photoradical polymerization initiator, a thiobenzoic acid S-phenyl polymerization initiator, and derivatives obtained by polymerizing these photoradical polymerization initiators. Among these intramolecular cleavage type radical initiators, from the viewpoint of showing favorable compatibility with the component (C) and excellent photo-curability, a benzyl ketal-based photoradical polymerization initiator, an α-hydroxyacetophenone-based photoradical polymerization initiator, a benzoin-based photoradical polymerization initiator, an aminoacetophenone-based photoinitiator, an oxime ketone-based photoradical polymerization initiator and an acylphosphine oxide-based photoradical polymerization initiator are preferable, and an α-hydroxyacetophenone-based photoradical polymerization initiator, a benzoin-based photoradical polymerization initiator, an aminoacetophenone-based photoinitiator and an oxime ketone-based photoradical polymerization initiator are more preferable.

Meanwhile, examples of a hydrogen-drawing type photoradical polymerization initiator include a benzophenone-based photoradical initiator expressed by the general formula (i) described below, a thioxanthone-based photoradical polymerization initiator expressed by the general formula (ii) described below, an anthraquinone-based photoinitiator expressed by the general formula (iii) described below, and a component expressed by the general formula (9):

[Chemical Formula 10]

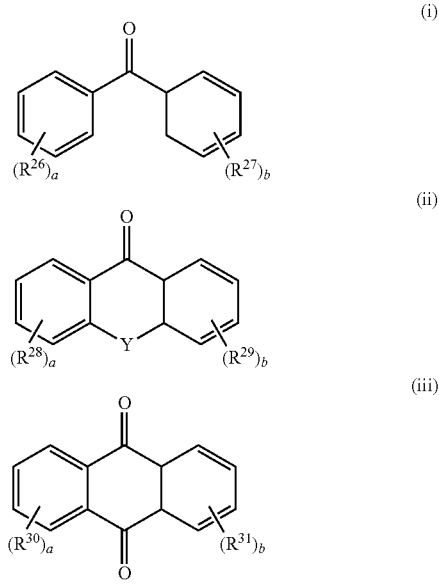

In the formulae (i) to (iii), Y represents O or S, $R^{26}$ to $R^{31}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—$COOR^p$), a carboxyl group, an aldehyde group, an amino group, an imino group, an amide group (—$CONR^pR^q$), an imide group (—$CONR^pCOR^q$), a cyano group, a sulfonic acid group (—$SO_3H$), a sulfonyl group (—$SO_2R^p$), a nitro group, a sulfide group (—S—$R^p$), a thiol group and an isocyanate group solely or a group obtained by mixing a plurality of any of the groups (wherein $R^p$ and $R^q$ each independently represents a substituted or unsubstituted alkyl group having 1 to 20 carbon atoms or a substituted or unsubstituted aryl group having 6 to 20 carbon atoms), and a and b each independently represents an integer of 0 to 4.

In the formula (1), $R^{26}$ and $R^{27}$ each is preferably a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an ester group (—$COOR^p$), a carboxyl group, an amino group, a sulfide group (—S—$R^p$) solely or a group obtained by mixing a plurality of any of the groups, more preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an ester group (—$COOR^p$), a carboxyl group, an amino group and a sulfide group (—S—$R^p$), and further more preferably selected from the group consisting of a hydrogen atom, a halogen atom, a hydroxy group, a linear or branched alkyl group having 1 to 20 carbon atoms, an aryl group having 6 to 20 carbon atoms, an amino group and a sulfide group (—S—$R^p$).

In the formula (ii), $R^{28}$ and $R^{29}$ each is preferably a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an ester group (—$COOR^p$), a carboxyl group, an amino group and a sulfide group (—S—$R^p$) solely or a group obtained by mixing a plurality of any of the groups, more preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an ester group (—$COOR^p$), a carboxyl group, an amino group and a sulfide group (—S—$R^p$), and further more preferably selected from the group consisting of a hydrogen atom, a halogen atom, a linear or branched alkyl group having 1 to 20 carbon atoms, an aryl group having 6 to 20 carbon atoms, an alkoxy group having 1 to 20 carbon atoms and an amino group.

In the formula (iii), $R^{30}$ and $R^{31}$ each is preferably a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an ester group (—$COOR^p$), a carboxyl group, an amino group and a sulfide group (—S—$R^p$) solely or a group obtained by mixing a plurality of any of the groups, more preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an ester group (—$COOR^p$), a carboxyl group, an amino group and a sulfide group (—S—$R^p$), and further more preferably selected from the group consisting of a hydrogen atom, a halogen atom, a hydroxy group, a linear or branched alkyl group having 1 to 20 carbon atoms, an alkoxy group having 1 to 20 carbon atoms and an amino group.

Examples of a benzylketal-based photoradical polymerization initiator include 2,2-dimethoxy-1,2-diphenylethane-1-one (benzyl dimethyl ketal/2,2-dimethoxy-2-phenyl acetophenone).

Examples of an α-hydroxyacetophenone-based photoradical polymerization initiator include 2-hydroxy-2-methyl-1-phenyl-propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 1-(4-dodecylbenzoyl)-1-hydroxy-1-methylethane, 1-(4-isopropylbenzoyl)-1-hydroxy-1-methylethane, 1-benzoyl-1-hydroxy-1-methylethane, 1-[4-(2-hydroxyethoxy)-benzoyl]-1-hydroxy-1-methylethane, 1-[4-(acryloyloxyethoxy)-benzoyl]-1-hydroxy-1-methylethane, phenyl-1-hydroxy-cyclohexyl ketone and 2-hydroxy-2-methyl-[4-(1-methylvinyl)phenyl]propanol oligomer, and from the viewpoint of photo activity, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 1-(4-dodecylbenzoyl)-1-hydroxy-1-methylethane, 1-(4-isopropylbenzoyl)-1-hydroxy-1-methylethane, 1-benzoyl-1-hydroxy-1-methylethane, 1-[4-(2-hydroxyethoxy)-benzoyl]-1-hydroxy-1-methylethane, 1-[4-(acryloyloxyethoxy)-benzoyl]-1-hydroxy-1-methylethane and phenyl-1-hydroxy-cyclohexyl ketone are preferable.

Examples of a benzoin-based photoradical polymerization initiator include benzoin, a benzoinisobutyl ether, a benzoinmethyl ether, a benzomethyl ether and a benzoinisopropyl ether.

Examples of an aminoacetophenone-based photoradical polymerization initiator include 2-methyl-1-[4-(methylthio) phenyl]-2-morpholinopropane-1-one and 2-benzyl-2-dimethylamino-1-(4-morpholinophenyl)-butanone-1.

Examples of an oxime ketone-based photoradical polymerization initiator include 1,2-octanedione, 1-[4-(phenylthio)-2-(O-benzoyloxime)], ethanone and 1-[9-ethyl-6-(2-methylbenzoyl)-9H-carbazole-3-yl]-1-(O-acetyloxime).

Examples of an acylphosphine oxide-based photoradical polymerization initiator include bis(2,4,6-trimethylbenzoyl)-phenylphosphine oxide and 2,4,6-trimethylbenzoyl-diphenylphosphine oxide.

Examples of a benzophenone-based photoradical initiator include benzophenone derivatives such as benzophenone, 4-methylbenzophenone, 3-benzoylbiphenyl, 4-(4-methylphenylthio)benzophenone, methyl 2-benzoylbenzoate, 4-phenylbenzophenone, 4,4'-bis(dimethoxy)benzophenone, 4,4'-bis(dimethylamino)benzophenone, 4,4'-bis(diethylamino)benzophenone, 2-benzoyl benzoic acid methyl ester, 2-methyl benzophenone, 3-methyl benzophenone, 3,3'-dimethyl-4-methoxy benzophenone and 2,4,6-trimethyl benzophenone, and 1-[4-(4-benzoylphenylsulfanyl)phenyl]-2-methyl-2-(4-methylphenylsulfonyl)-propane-1-one, and from the viewpoint of photo-curability, a compound in which an aromatic ring in benzophenone is not substituted by tertiary amine is preferable.

Examples of a thioxanthone-based photoradical polymerization initiator include thioxanthone derivatives such as thioxanthone, xanthone, 2-chlorothioxanthone, 4-chlorothioxanthone, 2-isopropylthioxanthone, 4-isopropylthioxanthone, 2,4-dimethylthioxanthone, 2,4-diethylthioxanthone, 1-chloro-4-propoxythioxanthone and 2,4-diethylthioxanthene-9-one.

An example of a fluorene-basedphotoradical initiator includes 2-hydroxy-9-fluorenone. Examples of an anthrone photoradical initiator include anthrone, dibenzosuberone and 2-amino-9-fluorenone.

Examples of an anthraquinone-based photoinitiator include anthraquinone, 2-ethylanthraquinone, 2-hydroxyanthraquinone and 2-aminoanthraquinone.

Examples of a compound expressed by the general formula (9) include 1-phenyl-1,2-propanedione, 1,3-diphenylpropanetrione, benzyl, 1,4-bisbenzyl, 4,4'-dimethylbenzyl, 4,4'-dibromobenzyl, 4,4'-difluorobenzyl, benzoyl formate, methyl benzoyl formate, ethyl benzoyl formate, methyl 4-nitrobenzoyl formate, methyl 4-methoxybenzoyl formate, ethyl 4-methoxybenzoyl formate, ethyl 4-n-butylbenzoyl formate, ethyl 4-t-butylbenzoyl formate, ethyl 3,4-dimethoxybenzoyl formate, ethyl 4-isopropylbenzoyl formate, ethyl 4-dimethylaminobenzoyl formate, ethyl 3,4-dimethylbenzoyl formate, ethyl 3-methylbenzoyl formate, ethyl 4-methylbenzoyl formate, ethyl 4-phenoxybenzoyl formate, ethyl 4-thiomethylbenzoyl formate, ethyl 4-cyanobenzoyl formate, methyl pyruvate, ethyl pyruvate, methyl 2-oxovalerate, ethyl 2-oxovalerate, dimethyl 2-oxoglutarate and ethyl 2-oxo-4-phenyl butyrate, but the compound is not limited to these examples:

[Chemical Formula 11]

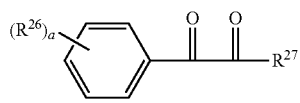

(9)

(wherein $R^{26}$ and $R^{27}$ each represents a hydrogen atom, a halogen atom or a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group, an aldehyde group, an amino group, an imino group, an amide group (—CONR$^p$R$^q$), an imide group (—CONR$^p$COR$^q$), a cyano group, a sulfonic acid group (—SO$_3$H), a sulfonyl group (—SO$_2$R$^p$), a nitro group, a sulfide group (—S—R$^p$), a thiol group, an isocyanate group solely or a group obtained by mixing a plurality of any of the groups (wherein R$^p$ and R$^q$ each independently represents a substituted or unsubstituted alkyl group having 1 to 20 carbon atoms or a substituted or unsubstituted aryl group having 6 to 20 carbon atoms), but is not limited thereto, and a each independently represents an integer of 0 to 5).

In the formula (9), $R^{26}$ and $R^{27}$ is preferably selected from the group consisting of a hydrogen atom, a halogen atom, a hydroxy group, a linear or branched alkyl group having 1 to 20 carbon atoms, an aryl group having 6 to 20 carbon atoms, an alkoxy group having 1 to 20 carbon atoms, an amino group, a cyano group and a nitro group and a sulfide group (—S—R$^p$), and more preferably selected from a hydrogen atom, a halogen atom, a hydroxy group, a linear or branched alkyl group having 1 to 20 carbon atoms, an aryl group having 6 to 20 carbon atoms and an alkoxy group having 1 to 20 carbon atoms.

An aromatic hydrocarbon used as the component (D) in the present invention includes naphthalene derivatives and anthracene derivatives.

Examples of the naphthalene derivatives include 1-methylnaphthalene, 2-methylnaphthalene, 1-fluoronaphthalene, 1-chloronaphthalene, 2-chloronaphthalene, 1-bromonaphthalene, 2-bromonaphthalene, 1-iodonaphthalene, 2-iodonaphthalene, 1-naphthol, 2-naphthol, 1-methoxynaphthalene, 2-methoxynaphthalene, 1,4-dicyanonaphthalene and methyl 3-hydroxy-2-naphthoate.

Examples of the anthracene derivatives include anthracene, 1,2-benzanthracene, 9,10-dichloroanthracene, 9,10-dibromoanthracene, 9,10-diphenylanthracene, 9-cyanoanthracene, 9,10-dicyanoanthracene and 2,6,9,10-tetracyanoanthracene.

Examples of a nitro compound used as the component (D) in the present invention include nitrobenzoic acid and nitroaniline. Examples of the nitroaniline include 2-nitroaniline, 3-nitroaniline and 4-nitroaniline, and examples of the nitrobenzoic acid include 2-nitrobenzoic acid, methyl 2-nitrobenzoate, 3-nitrobenzoic acid, methyl 3-nitrobenzoate, 4-nitrobenzoic acid and methyl 4-nitrobenzoate.

An example of a dye includes riboflavin, rose bengal, eosin, erythrosine, methylene blue or new methylene blue rose and, in particular, rose bengal is used because of having high photo activity.

An adding amount of a photosensitizing agent (D) in the curable composition of the present invention is required to refer to an absorption wavelength and a molar absorption coefficient, but is preferably from 0.001 to 50 parts by mass, with respect to 100 parts by mass of the total amount of the component (A) and the component (B) in the curable composition of the present invention, more preferably from 0.01 to 20 parts by mass, further more preferably from 0.015 to 15 parts by mass, and particularly preferably from 0.05 to 10 parts by mass. When the adding amount is less than 0.01 parts by mass, a sufficient improvement effect of photo activity cannot be obtained, and when it is too larger than 20 parts by mass, there is a fear of inhibiting a catalytic action of the component (C).

Furthermore, the component (D) is preferably from 0.001 to 10 parts by mass with respect to 1 part by mass of the component (C), more preferably from 0.005 to 5 parts by mass, further more preferably from 0.0075 to 3 parts by mass, and particularly preferably from 0.01 to 2 parts by mass. When the component (D) is less than 0.001 parts by mass with respect to 1 part by mass of the component (C), there is a fear that an improvement effect of photo activity cannot be attained, and when it exceeds 10 parts by mass, there is a fear of resulting in a cured product that easily generates outgas.

<Component (E)>

A compound having one or more radical polymerizable groups in the molecule thereof may be further added as the component (E) in the present invention. That is, the curable composition of the present invention can further contain a compound having one or more radical polymerizable groups in the molecule of (E). The radical polymerizable group is a vinyl group, an allyl group, an acryloyl group, a methacryloyl group, or the like, and is desirably a compound having one or more (meth)acryloyl groups in the molecule thereof in the sense of being excellent in photoradical polymerization with a single use. Examples thereof include 2-hydroxyethyl acrylate, 2-hydroxypropyl (meth)acrylate, 4-hydroxybutyl (meth)acrylate, 2-hydroxybutyl (meth)acrylate, isobutyl (meth)acrylate, t-butyl (meth)acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxyethyleneglycol (meth)acrylate, 2-ethoxyethyl (meth)acrylate, tetrahydrofurfuryl (meth)acrylate, benzyl (meth)acrylate, ethylcarbitol (meth)acrylate, phenoxyethyl (meth)acrylate, phenoxydiethyleneglycol (meth)acrylate, phenoxypolyethylene glycol (meth)acrylate, methoxypolyethylene glycol (meth)acrylate, 2,2,2,-trifluoroethyl (meth)acrylate, 2,2,3,3,-tetrafluoropropyl (meth)acrylate, 1H,1H,5H,-octafluoropentyl (meth)acrylate, imide (meth)acrylate, methyl (meth)acrylate, ethyl (meth)acrylate, n-butyl (meth)acrylate, propyl (meth)acrylate, n-butyl (meth)acrylate, cyclohexyl (meth)acrylate, 2-ethylhexyl (meth)acrylate, n-octyl (meth)acrylate, isononyl (meth)acrylate, isomyristyl (meth)acrylate, 2-butoxyethyl (meth)acrylate, 2-phenoxyethyl (meth)acrylate, bicyclopentenyl (meth)acrylate, isodecyl (meth)acrylate, diethylaminoethyl (meth)acrylate, dimethylaminoethyl (meth)acrylate, 2-(meth)acryloyloxy ethyl succinic acid, 2-(meth)acryloyloxy ethyl hexahydrophthalic acid, 2-(meth)acryloyloxy ethyl 2-hydroxypropyl phthalate, glycidyl (meth)acrylate, 2-(meth) acryloyloxy ethyl phosphate, 1,4-butanediol di(meth)acrylate, 1,3-butanediol di(meth)acrylate, 1,6-hexanediol di(meth)acrylate, 1,9-nonanediol di(meth)acrylate, 1,10-decanediol di(meth)acrylate, 2-n-butyl-2-ethyl-1,3-propanediol di(meth)acrylate, dipropylene glycol di(meth)acrylate, tripropylene glycol di(meth)acrylate, polypropylene glycol (meth)acrylate, ethyleneglycol di(meth)acrylate, diethylene glycol di(meth)acrylate, tetraethylene glycol di(meth)acrylate, polyethylene glycol di(meth)acrylate, propylene oxide adduct bisphenol A di(meth)acrylate, bisphenol A di(meth)acrylate, ethylene oxide adduct bisphenol A di(meth)acrylate, ethylene oxide adduct bisphenol F di(meth)acrylate, dimethylol dicyclopentadienyl-di(meth)acrylate, 1,3-butylene glycol di(meth)acrylate, neopentyl glycol di(meth)acrylate, ethylene oxide-modified isocyanuric acid di(meth)acrylate, 2-hydroxy-3-(meth)acryloyloxypropyl (meth)acrylate, carbonate diol di(meth)acrylate, pentaerythritol tri(meth)acrylate, trimethylolpropane tri(meth)acrylate, propylene oxide adduct trimethylolpropane tri(meth)acrylate, ethylene oxide adduct trimethylolpropane tri(meth)acrylate, caprolactone modified trimethylolpropane tri(meth) acrylate, ethylene oxide adduct isocyanuric acid tri(meth) acrylate, dipentaerythritol penta(meth)acrylate, dipentaerythritol hexa(meth)acrylate, ditrimethylolpropane tetra(meth)acrylate, pentaerythritol tetra(meth)acrylate, glycerine tri(meth)acrylate, propylene oxide adduct glycerine tri(meth)acrylate, tris(meth)acryloyloxy ethyl phosphate, and urethane (meth)acrylate (e.g., aliphatic urethane acrylate). Among these substances, propylene oxide adduct bisphenol A di(meth)acrylate, bisphenol A di(meth)acrylate, bisphenol F di(meth)acrylate, ethylene oxide adduct bisphenol A di(meth)acrylate, ethylene oxide adduct bisphenol F di(meth)acrylate and urethane (meth)acrylate are preferably used from the viewpoint of compatibility with the component (A). A blending amount is not particularly limited and is preferably from 0.1 to 200 parts by mass with respect to 100 parts by mass of the total amount of the component (A) and the component (B) of the present invention.

Due to addition of the component (E), this component is quickly polymerized by light irradiation and flowability of the composition can be adjusted, adhesivity and a temporal fixing property can be expressed, and the composition can be used in steps such as previously adhering an adhesive agent to a member and curing later, and the like.

In the case of being photo-cured in a combination use of an epoxy resin and a compound containing a radical polymerizable group, although a cation initiator is generally conventionally used for the purpose of polymerizing a glycidyl group, in this case, there has been a problem such that when a compound containing a urethane bonding moiety exists in a composition, the urethane moiety functions as a cation polymerization inhibitor and acrylate containing the urethane bonding moiety in the molecule, so-called urethane (meth) acrylate cannot be thus used, however, in the present invention, this problem does not occur since polymerization of epoxy proceeds by a use of a base catalyst and even urethane (meth)acrylate and a compound containing an isocyanuric ring, which could not be used conventionally, can be used without the problem of inhibition of polymerization of a glycidyl group.

In the curable composition of the present invention, a compound containing one glycidyl group in the molecule thereof and/or a compound containing one thiol group in the molecule thereof may be added within the range which does not damage the characteristics of the present invention. These compounds are used for making the entire composition low in a viscosity, improvement in operational properties, adjustment of reactivity, and the like. When an epoxy compound and a thiol compound which are described above are added, it is desirable to adjust a blending ratio of the epoxy compound of the component (A) and the thiol compound of the component (B) in consideration of each of the epoxy equivalent and the thiol equivalent.

Any compound having an effect of suppressing anion polymerization may be further added to the present invention within the range which does not damage the characteristics of the present invention. This is added for enhancing stability during storage of the composition. Examples thereof include organic acids and inorganic acids which are liquid or solid at room temperature, and oligomers, polymers, boric acid esters and phosphoric acid esters which are liquid or solid at room temperature, contain an acidic group in the molecule and may have a functional group other than the acidic group. Examples thereof include sulfuric acid, acetic acid, adipic acid, tartaric acid, fumaric acid, barbituric acid, boric acid, pyrogallol, a phenol resin and carboxylic acid anhydride, but are not limited thereto.

Boric acid esters are liquid or solid boric acid esters at room temperature. Examples of the boric acid esters include trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl) (1,4,7-trioxaundecyl) borane, tribenzyl borate, triphenyl borate, tri-o-tolyl borate, tri-m-tolyl borate and triethanolamine borate, but are not limited thereto.

Examples of phosphoric acid esters include ethyl phosphate, butyl phosphate, propyl phosphate, 2-ethyl hexyl phosphate, dibutyl phosphate, di(2-ethylhexyl) phosphate, oleyl phosphate and ethyldiethyl phosphate, but are not limited thereto.

These acidic substances (acidic group-containing compounds, boric acid esters and phosphoric acid esters) have an effect of improving storage stability before irradiation of an energy ray to the resin composition of the present invention. These compounds may be used solely or in mixing two or more of the compounds. These compounds and an epoxy resin, and the like are mixed to form a master batch and the master batch may also be added. An example of a commercially available product as a storage stability improving agent includes CURE DUCT L-07N manufactured by SHIKOKU CHEMICALS CORPORATION, but is not limited thereto. A range of a blending amount of these compounds is not particularly limited.

To the curable composition of the present invention, the following additives may be further added in appropriate amounts within the range which does not damage the characteristics of the invention; coloring agents such as pigments and dyes, inorganic fillers such as calcium carbonate, talc, silica, alumina and aluminum hydroxide, conductive particles such as silver, a flame retardant, organic fillers such as an acrylic rubber and a silicon rubber, a polyimide resin, a polyamide resin, general-purpose phenoxy resins such as a bisphenol A-type phenoxy resin and a bisphenol F-type phenoxy resin, and a bisphenol A bisphenol F copolymerized phenoxy resin, thiiranes, isocyanates, cyanate esters, polymethacrylate resins, polyacrylate resins, polyimide resins, polyurethane resins, polyester resins, a polyvinyl butyral resin, an SBS resin and its epoxy resin modified product, polymers and thermoplastic elastomers of an SEBS resin and its modified product, a plasticizer, an organic solvent, an antioxidant, an antifoaming agent, a coupling agent, a leveling agent and a rheology controlling agent. According to addition of these additives, a composition excellent in resin strength, adhesion strength, flame retardancy, heat conductivity, operational properties, and the like, and a cured product thereof can be obtained.

As a method of curing the resin composition of the present invention, by simultaneously performing irradiation of an energy ray and heating, a cured product can be obtained with a less energy irradiation amount and in a shorter time. A cured product can be also obtained in a short time also by heating after irradiation of an energy ray. Examples of the active energy ray in this case include electron rays and visible light rays but are not particularly limited. An irradiation amount of an active energy ray is preferably 0.1 J/cm$^2$ or more and a wavelength of an active energy ray is preferably from 150 to 830 nm. The heating condition is preferably from room temperature to 200° C., more preferably from 50 to 200° C., and further more preferably from 70 to 150° C.

Accordingly, the present invention also provides a curing method in which the curable composition of the present invention is irradiated with an active energy ray at a wavelength from 150 to 830 nm and the composition is then cured at room temperature or under a heating environment.

The composition in the blending constitution in the present invention can be quickly cured after energy irradiation, and also can be cured by being left to stand at room temperature or heating for a short time after energy irradiation without curing immediately after the energy irradiation and, due to the latter property, the composition can be adhered by coating and laminating after irradiation of energy to the composition even when an adhered member does not transmit energy such as light.

According to the present invention, a cured product obtained by curing the curable composition of the present invention (resin cured product) is also provided.

A resin cured product obtained by a curing treatment carried out on the composition of the present invention has excellent characteristics such as toughness and high adhesion strength, and can be used in various applications such as adhesion, sealing, casting, painting and coating materials, and molding of optical elements. As specific applications in the field of automobiles and transport aircrafts, such a resin cured product can be used in adhesion, sealing, casting, molding and coating materials of an automobile switch part, a head lamp, an engine internal part, an electric part, a driving engine, a brake oil tank, and the like. In a flat panel display, the resin cured product can be used in adhesion, sealing, casting, molding and coating materials of a liquid crystal display, an organic electroluminescence, a light-emitting diode display device and a field emission display. In the field of recording, the resin cured product can be used in adhesion, sealing, casting, molding and coating materials of a video disc, CD, DVD, MD, a pickup lens, hard disc peripheral elements (such as a spindle motor member and a magnetic head actuator member), Blu-ray Disc, and the like. In the field of electronic materials, examples of the applications include a sealing material, a dye bond agent, a conductive adhesive agent, an anisotropic conductive adhesive agent, an interlayer adhesive agent of a multilayered substrate containing a build-up substrate and a solder resist of an electronic part, an electric circuit, an electric contact, a semiconductor element, or the like. In the field of batteries, such a cured resin product can be used in adhesion, sealing, casting, molding and coating materials of a Li battery, a manganese battery, an alkaline battery, a nickel-based battery, a fuel battery, a silicon-based solar battery, a dye sensitizing solar battery, an organic solar battery, and the like. In the field of optical components, the cured resin product can be used in adhesion, sealing, casting, molding and coating materials of optical switch peripheral elements, optical fiber materials of the optical connector periphery, an optical receiving part, an optical circuit part, optoelectronic integrated circuit peripheral elements, and the like, in optical communication. In the field of optical apparatuses, the cured resin product can be used in adhesion, sealing, casting, molding and coating materials of a lens material of a still camera, a finder prism, a target prism, a finder cover, an optical receiving sensor part, a shooting lens, a projection lens of a projection television, and the like. In addition, a gap is provided between a protection part such as glass and an image display part in an image display device such as a liquid crystal, a touch panel, or the like, and the curable composition of the present invention may be also used in an application of filling the gap.

The present application is based on Japanese Patent Application No. 2011-276148 which has been filed on Dec. 16, 2011, and the disclosure is incorporated herein by reference in its entirety.

EXAMPLES

The present invention will be specifically described below by referring to Examples. However, the present invention is not limited to these Examples below. In addition, blending ratios in tables described below are based on mass.

Examples 1 to 55 and a to f and Comparative Examples 1 to 7 and a and b

The following components were readied in order to prepare a composition.

Materials used in examples and comparative examples of the present invention are commercially available products or reagents shown in the description below.

<Component A>
Epiclon 835LV: bisphenol type epoxy resin (manufactured by DIC Corporation) (epoxy equivalent of 165 g/eq)
Denacol EX-411: aliphatic 4 epoxy resin (pentaerythritol polyglycidyl ether) (manufactured by Nagase ChemteX Corporation) (epoxy equivalent of 229 g/eq)
JER807: bisphenol F type epoxy resin (manufactured by Mitsubishi Chemical Corporation) (epoxy equivalent of 170 g/eq)
YX-8000: hydrogenated bisphenol A type epoxy resin (manufactured by Mitsubishi Chemical Corporation) (epoxy equivalent of 205 g/eq).

<Component B>
PTMP: pentaerythritol tetrakis(3-mercaptopropionate) (reagent manufactured by Aldrich) (thiol equivalent of 122 g/eq)
DPMP: dipentaerythritol hexa-3-mercaptopropionate (manufactured by SAKAI CHEMICAL INDUSTRY CO., LTD.) (thiol equivalent of 130 g/eq)
JER CURE QX40: pentaerythritol tetrakis(3-mercaptopropionate) (manufactured by Japan Epoxy Resins Co., Ltd.) (thiol equivalent of 122 g/eq)
JER CURE QX30: trimethylolpropane tris(3-mercaptopropionate) (manufactured by Japan Epoxy Resins Co., Ltd.) (thiol equivalent of 132 g/eq).

<Component C>
UCAT-5002: a salt of 1,8-diazabicyclo[5.4.0]undeca-7-ene structure-containing compound and tetraphenyl borate (manufactured by San-Apro Ltd.)
NaBPh4: a sodium salt of tetraphenyl borate (reagent manufactured by DOJINDO LABORATORIES)

NBu4BPh4: tetrabutyl ammonium tetraphenyl borate (reagent manufactured by Aldrich)
DBN-K: 1,5-diazabicyclo[4.3.0]nona-5-ene-tetraphenyl borate (manufactured by HOKKO CHEMICAL INDUSTRY CO., LTD.)
EMZ-K: 2-ethyl-4-methyl imidazolium tetraphenyl borate (manufactured by HOKKO CHEMICAL INDUSTRY CO., LTD.)
TPP-MK: tetraphenyl phosphonium•tetra-p-tolyl borate) (manufactured by HOKKO CHEMICAL INDUSTRY CO., LTD.)
TPTP-MK: p-tolyltriphenyl phosphonium tetra-p-tolyl borate (manufactured by HOKKO CHEMICAL INDUSTRY CO., LTD.)
TPPZ-K: benzyltriphenyl phosphonium tetraphenyl borate (manufactured by HOKKO CHEMICAL INDUSTRY CO., LTD.)
P3B: tetrabutyl ammonium-butyltriphenyl borate (manufactured by Showa Denko K.K.)
N3B: tetrabutyl ammonium-butyltri-1-naphthalenyl borate (manufactured by Showa Denko K.K.)
PBG-SA1: a salt of 1,8-diazabicyclo[5.4.0]undeca-7-ene structure-containing compound and a borate compound (manufactured by San-Apro Ltd.)
PBG-SA2: a salt of 1,8-diazabicyclo[5.4.0]undeca-7-ene structure-containing compound and a borate compound (manufactured by San-Apro Ltd.)
PBG-SA1BU: a salt of 1,8-diazabicyclo[5.4.0]undeca-7-ene structure-containing compound and a borate compound (manufactured by San-Apro Ltd.)
TBPTPB: tetrabutylphosphonium tetraphenyl borate (reagent manufactured by Wako Pure Chemical Industries, Ltd.)

<Comparative Components of Component C>

UCAT-506: a salt of 1,8-diazabicyclo[5.4.0]undeca-7-ene and paratoluene sulfonic acid (manufactured by San-Apro Ltd.)
TPP-S: triphenyl phosphine triphenyl borane (manufactured by HOKKO CHEMICAL INDUSTRY CO., LTD.)
PK: pyridinetriphenyl borate (manufactured by HOKKO CHEMICAL INDUSTRY CO., LTD.)
DBU: 1,8-diazabicyclo[5.4.0]undeca-7-ene (manufactured by San-Apro Ltd.)
TPP: triphenyl phosphine (manufactured by HOKKO CHEMICAL INDUSTRY CO., LTD.)
NBC-101: nitrobenzylcyclohexane carbamate (manufactured by Midori Kagaku Co., Ltd.).

<Component D>

9-fluorenone (reagent manufactured by Tokyo Chemical Industry Co. Ltd.)
anthraquinone (reagent manufactured by Tokyo Chemical Industry Co., Ltd.)
2-ethyl anthraquinone (reagent manufactured by Tokyo Chemical Industry Co., Ltd.)
dibenzosuberone (reagent manufactured by Tokyo Chemical Industry Co., Ltd.)
thioxanthone (reagent manufactured by Tokyo Chemical Industry Co. Ltd.)
KAYACURE ITX: 2-isopropylthioxanthone (manufactured by Nippon Kayaku Co., Ltd.)
KAYACURE DETX-S: 2,4-diethylthioxanthone (manufactured by Nippon Kayaku Co., Ltd.)
benzophenone (reagent manufactured by Tokyo Chemical Industry Co. Ltd.)
4-methylbenzophenone (reagent manufactured by Tokyo Chemical Industry Co., Ltd.)
SPEEDCURE PBZ: 4-methyl benzophenone, 3-benzoylbiphenyl (manufactured by LAMBSON Ltd.)
SPEEDCUREBMS: 4-(4-methylphenylthio)benzophenone (manufactured by LAMBSON Ltd.)
4,4-bis(dimethylamino)benzophenone (reagent manufactured by Tokyo Chemical Industry Co., Ltd.)
methyl 2-benzoyl benzoate (reagent manufactured by Tokyo Chemical Industry Co., Ltd.)
ESACURE 1001M: 1-[4-(4-benzoylphenylsulfanyl)phenyl]-2-methyl-2-(4-methylphenylsulfonyl)-propane-1-one (manufactured by LAMBSON Ltd.)
benzyl (reagent manufactured by Tokyo Chemical Industry Co., Ltd.)
DAROCUR MBF: methyl benzoyl formate (manufactured by BASF Ltd.)
IRGACURE651: benzyl dimethyl ketal (2,2-dimethoxy-2-phenyl acetophenone) (manufactured by BASF Ltd.)
IRGACURE1173: 2-hydroxy-2-methyl-1-phenyl-propane-1-one (manufactured by BASF Ltd.)
IRGACURE 2959: 1-[4-(2-hydroxyethoxy)-phenyl]-2-hydroxy-2-methyl-1-propane-1-one (manufactured by BASF Ltd.)
ESACURE One: 2-hydroxy-2-methyl-[4-(1-methylvinyl)phenyl]propanol oligomer (oligo(2-hydroxy-2-methyl-1-(4-(1-methylvinyl)phenyl)propanone) (manufactured by LAMBSON Ltd.)
benzoin (reagent manufactured by Tokyo Chemical Industry Co., Ltd.) benzoinisobutyl ether (reagent manufactured by Tokyo Chemical Industry Co., Ltd.)
methyl 3-hydroxy-2-naphthoate (reagent manufactured by Tokyo Chemical Industry Co., Ltd.)
anthracene (reagent manufactured by Tokyo Chemical Industry Co., Ltd.)
UVS1331: 9,10-dibutoxy anthracene (manufactured by Kawasaki Kasei Chemicals Ltd.)
fluoranthene (reagent manufactured by Tokyo Chemical Industry Co., Ltd.)
fluorene (reagent manufactured by Tokyo Chemical Industry Co., Ltd.)
methyl 4-nitrobenzoate (reagent manufactured by Tokyo Chemical Industry Co., Ltd.)
IRGACURE907: 2-methyl-1 [4-(methylthio)phenyl]-2-morpholinopropane-1-one (manufactured by BASF Ltd.)
IRGACURE369: 2-benzyl-2-dimethylamino-1-(4-morpholinophenyl)-butanone-1 (manufactured by BASF Ltd.)
IRGACURE OXE-1: 1.2-octanedione, 1-[4-(phenylthio)-2-(O-benzoyloxime)] (manufactured by BASF Ltd.)
IRGACURE OXE-2: ethanone, 1-[9-ethyl-6-(2-methylbenzoyl)-9H-carbazole-3-yl]-, 1-(O-acetyloxime) (manufactured by BASF Ltd.)
Rose Bengal (reagent manufactured by Tokyo Chemical Industry Co., Ltd.)
SPEEDCURE MBF: methyl benzoyl formate (manufactured by LAMBSON Ltd.)

<Component E>

UN-6200: aliphatic urethane acrylate (manufactured by Negami Chemical Industrial Co., Ltd.)

<Other Components>

Denacol EX-146: monofunctional epoxy monomer (p-tert-butylphenylglycidyl ether) (manufactured by Nagase ChemteX Corporation)
L07N: boric acid ester compound (manufactured by SHIKOKU CHEMICALS CORPORATION)

KBM403: glycidyl group-containing silane coupling agent (3-glycidoxypropyl trimethoxysilane) (manufactured by Shin-Etsu Chemical Co., Ltd.)

R805: fumed silica with an average particle diameter of 14 nm, which is surface-treated with alkylsilane (manufactured by Degussa Ltd.)

Preparation of Compositions of Examples 1 to 19 and a to f and Comparative Examples 3 and 4

The component (C) was dissolved in a small amount of dichloromethane (manufactured by KANTO CHEMICAL CO., INC.) by a weight ratio shown in Tables 1 to 5, thereto were then added the component (A), the component (B) and the component (D), these components are mixed by stirring at room temperature, thereafter stirring at room temperature under reduced pressure and dichloromethane was completely removed to thus prepare a composition.

Preparation of Compositions Other than the Above Described Examples and Comparative Examples The component (C) was mixed in the component (A) by a weight ratio shown in Tables 1 to 5 and dissolved by stirring at 40° C., thereafter adding the residual components at room temperature, and these components were mixed by stirring to thus prepare a composition.

[Storage Stability at Room Temperature]

In a light shielding container, 3 g of each composition was sealed and preserved in a room at 25° C., and a time until the composition is gelated and did not flow by visual observation was measured. Note that ">30 days" means a composition that was not gelated after 30 days or later.

[Curing Time]

On a slide glass, 0.01 g of a composition was dropped and covered with the cover glass and the composition was prepared to be a test piece sandwiched between the glasses as a thin film. This test piece was passed through twice a conveyer-type ultraviolet radiation apparatus (lamp: UVL-4001-N) manufactured by USHIO INC., which was set at a 365 nm-ultraviolet accumulated light quantity of 3 J/cm$^2$ per one pass, to irradiate the test piece with ultraviolet rays and then quickly left to stand in a constant-temperature dry furnace set at 90° C. The test piece was observed at a specified interspace and a time until the glasses are adhered and cannot be moved by hands was measured to be a curing time.

As for the specified interspace, observations were performed every 1 minute from 1 to 10 minutes after passing through the conveyer once and twice and leaving to stand at 90° C., every 2 minutes from 10 to 30 minutes, and every 10 minutes after 30 minutes, the measurement was carried out until 300 minutes, and when a composition was not cured and adhered even after 300 minutes, the composition was mentioned as ">300."

A curing time was measured in the same method also when a test piece was left to stand at 90° C. without performing ultraviolet irradiation. The results were described as "a curing time without ultraviolet irradiation" in Tables 1 to 5. Note that "incapable measurement" means that curability could not be evaluated since storage stability of a liquid-state composition was too inferior. Specifically, it is a test piece that was gelated within 10 minutes in the "storage stability at room temperature" described above.

[Appearance Test]

On a slide glass, 0.01 g of a composition was dropped and covered with the cover glass and the composition was prepared to be a test piece sandwiched between the glasses as a thin film. This test piece was passed through once or twice a conveyer-type ultraviolet radiation apparatus (lamp: UVL-4001-N) manufactured by USHIO INC., which was set at a 365 nm-ultraviolet accumulated light quantity of 3 J/cm$^2$ per one pass, to irradiate the test piece with ultraviolet rays and then the appearance of the test piece was evaluated based on the following evaluation criteria.

<Evaluation Criteria>

Cured: a test piece that was confirmed to be adhered and not able to be moved by hands; and uncured: a test piece that was not adhered and moved by hands.

TABLE 1

| | Components | Example 1 | Example 2 | Example 3 | Example 4 | Example 5 | Example 6 | Example 7 | Example a | Example b | Example c |
|---|---|---|---|---|---|---|---|---|---|---|---|
| (A) | 835LV | 100 | 100 | 100 | 100 | 100 | 100 | 100 | 100 | 100 | 100 |
| (B) | PTMP | 75 | 75 | 75 | 75 | 75 | 75 | 75 | 75 | 75 | 75 |
| (C) | UCAT-5002 | 3.38 | | | | | | | | | |
| | NBu4BPh4 | | 3.37 | | | | | | | | |
| | TPP-MK | | | 4.29 | | | | | | | |
| | TPTP-MK | | | | 4.36 | | | | | | |
| | TPPZ-K | | | | | 4.03 | | | | | |
| | P3B | | | | | | 3.25 | | | | |
| | N3B | | | | | | | 4.15 | | | |
| | PBG-SA1 | | | | | | | | 1.00 | | |
| | PBG-SA2 | | | | | | | | | 1.00 | |
| | PBG-SA1BU | | | | | | | | | | 1.00 |
| | TBPTPB | | | | | | | | | | |
| For comparison | UCAT-506 | | | | | | | | | | |
| | TPP-S | | | | | | | | | | |
| | PK | | | | | | | | | | |
| | DBU | | | | | | | | | | |
| | TPP | | | | | | | | | | |
| | NBO-101 | | | | | | | | | | |
| | Curing time at 90° C. without irradiation of ultraviolet rays (min.) | >300 | >300 | 180 | 120 | >300 | 160 | 240 | >300 | >300 | 280 |
| | Appearance after irradiation of ultraviolet rays once | uncured | uncured | uncured | uncured | uncured | uncured | uncured | uncured | uncured | uncured |
| | Appearance after irradiation of ultraviolet rays twice | uncured | uncured | uncured | uncured | uncured | uncured | cured | uncured | uncured | uncured |

TABLE 1-continued

| | Components | Example d | Comparative Example 1 | Comparative Example 2 | Comparative Example 3 | Comparative Example 4 | Comparative Example 5 | Comparative Example 6 | Comparative Example a |
|---|---|---|---|---|---|---|---|---|---|
| | Curing time at 90° C. after irradiation of ultraviolet rays twice (min.) | 260 | 18 | 1 | 1 | 16 | 60 | 0 | 2 | 6 | 2 |
| | Storage stability at room temperature | >30 days | >30 days | >30 days | >30 days | >30 days | >30 days | >30 days | >30 days | >30 days | >30 days |
| (A) | 835LV | 100 | 100 | 100 | 100 | 100 | 100 | 100 | 100 |
| (B) | PTMP | 75 | 75 | 75 | 75 | 75 | 75 | 75 | 75 |
| (C) | UCAT-5002 | | | | | | | | |
| | NBu4BPh4 | | | | | | | | |
| | TPP-MK | | | | | | | | |
| | TPTP-MK | | | | | | | | |
| | TPPZ-K | | | | | | | | |
| | P3B | | | | | | | | |
| | N3B | | | | | | | | |
| | PBG-SA1 | | | | | | | | |
| | PBG-SA2 | | | | | | | | |
| | PBG-SA1BU | | | | | | | | |
| | TBPTPB | 3.47 | | | | | | | |
| For comparison | UCAT-506 | | | 4.00 | | | | | |
| | TPP-S | | | | 3.02 | | | | |
| | PK | | | | | 1.93 | | | |
| | DBU | | | | | | 1.00 | | |
| | TPP | | | | | | | 1.57 | |
| | NBO-101 | | | | | | | | 1.67 |
| | Curing time at 90° C. without irradiation of ultraviolet rays (min.) | >300 | >300 | >300 | incapable measurement | 8 | incapable measurement | 3 | >300 |
| | Appearance after irradiation of ultraviolet rays once | uncured | uncured | uncured | incapable measurement | uncured | incapable measurement | uncured | uncured |
| | Appearance after irradiation of ultraviolet rays twice | uncured | uncured | uncured | incapable measurement | uncured | incapable measurement | uncured | uncured |
| | Curing time at 90° C. after irradiation of ultraviolet rays twice (min.) | 40 | >300 | >300 | incapable measurement | 15 | incapable measurement | 12 | >300 |
| | Storage stability at room temperature | >30 days | >30 days | >30 days | 5 min | 1 day | 1 min | 1 day | >30 days |

It is found from Examples 1 to 7 in Table 1 that the composition of the present invention, which is made of the components (A) and (B) and various components (C), can be quickly cured at room temperature or a low heating temperature by radiating ultraviolet rays and also has favorable storage stability at room temperature. It is found from Comparative Examples 2 to 5 that when a compound having a structure similar to the component (C) but not having a borate salt structure shown in the present invention was used, the composition is not cured quickly by light irradiation and storage stability also deteriorates.

It is found from Comparative Example a that when a conventionally known photobase generating agent that does not correspond to (C) of the present invention was used, a sufficient curing speed cannot be attained. It is also found from Comparative Example b that a sufficient curing speed cannot be attained even though (D) is added.

TABLE 2

| | Components | Example 8 | Example 9 | Example 10 | Example 11 | Example 12 | Example 13 | Example 14 | Example 15 | Example 16 |
|---|---|---|---|---|---|---|---|---|---|---|
| (A) | 835LV | 100 | 100 | 100 | 100 | 100 | 100 | 100 | 100 | 100 |
| (B) | PTMP | 75 | 75 | 75 | 75 | 75 | 75 | 75 | 75 | 75 |
| (C) | UCAT-5002 | 3.38 | 3.38 | 1.69 | | | | | | |
| (C) | NaBPh4 | | | | 2.05 | | | | | |
| | NBu4BPh4 | | | | | 3.37 | | | | |
| | DBN-K | | | | | | 2.66 | | | |
| | EMZ-K | | | | | | | 2.58 | | |
| | TPP-MK | | | | | | | | 4.29 | |
| | TPTP-MK | | | | | | | | | 4.36 |
| | TPPZ-K | | | | | | | | | |
| | P3B | | | | | | | | | |
| | N3B | | | | | | | | | |
| | PBG-SA2 | | | | | | | | | |
| | TBPTPB | | | | | | | | | |
| For comparison | NBC-101 | | | | | | | | | |
| (D) | 9-fluorenone | 1.08 | 0.54 | 0.83 | 1.08 | 1.08 | 1.08 | 1.08 | 1.08 | 1.08 |
| | Curing time at 90° C. without irradiation of ultraviolet rays (min.) | >300 | >300 | >300 | 80 | >300 | >300 | 90 | 70 | 100 |

TABLE 2-continued

| | | | | | | | | | |
|---|---|---|---|---|---|---|---|---|---|
| Appearance after irradiation of ultraviolet rays once | uncured | uncured | uncured | uncured | uncured | uncured | uncured | cured | cured |
| Appearance after irradiation of ultraviolet rays twice | cured | uncured | uncured | uncured | uncured | uncured | uncured | cured | cured |
| Curing time at 90° C. after irradiation of ultraviolet rays twice (min.) | 0 | 8 | 1 | 4 | 3 | 40 | 30 | 0 | 0 |
| Storage stability at room temperature | >30 days | >30 days | >30 days | 14 days | >30 days | >30 days | >30 days | >30 days | >30 days |

| Components | | Example 17 | Example 18 | Example 19 | Example e | Example f | Comparative Example 7 | Comparative Example b |
|---|---|---|---|---|---|---|---|---|
| (A) | 835LV | 100 | 100 | 100 | 100 | 100 | 100 | 100 |
| (B) | PTMP | 75 | 75 | 75 | 75 | 75 | 75 | 75 |
| (C) | UCAT-5002 | | | | | | | |
| (C) | NaBPh4 | | | | | | | |
| | NBu4BPh4 | | | | | | | |
| | DBN-K | | | | | | | |
| | EMZ-K | | | | | | | |
| | TPP-MK | | | | | | | |
| | TPTP-MK | | | | | | | |
| | TPPZ-K | 4.03 | | | | | | |
| | P3B | | 3.25 | | | | | |
| | N3B | | | 4.15 | | | | |
| | PBG-SA2 | | | | 1.00 | | | |
| | TBPTPB | | | | | 3.47 | | |
| For comparison | NBC-101 | | | | | | | 1.67 |
| (D) | 9-fluorenone | 1.08 | 1.08 | 1.08 | 0.80 | 2.00 | 1.08 | 2.00 |
| Curing time at 90° C. without irradiation of ultraviolet rays (min.) | | >300 | 100 | 150 | >300 | >300 | >300 | >300 |
| Appearance after irradiation of ultraviolet rays once | | uncured | uncured | cured | uncured | uncured | uncured | uncured |
| Appearance after irradiation of ultraviolet rays twice | | uncured | uncured | cured | uncured | uncured | uncured | uncured |
| Curing time at 90° C. after irradiation of ultraviolet rays twice (min.) | | 10 | 1 | 0 | 3 | 5 | >300 | >300 |
| Storage stability at room temperature | | >30 days | >30 days | >30 days | >30 days | >30 days | >30 days | >30 days |

It is found from Examples 8 to 19 in Table 2 that addition of the component (D) enables significant improvement in photo activity and exceptional acceleration of curing, and it is found from Examples 8 to 10 in Table 2 that by adjusting adding amounts of (C) and (D) while curing conditions (ultraviolet irradiation amount and curing temperature) were kept constant, a curing time of a composition can be adjusted. It is found from Comparative Examples 1 and 7 that when the component (C) of the present invention is not contained, a composition is not cured even with heating after light irradiation. It is found from Comparative Example b that when a conventionally known photobase generating agent that does not correspond to (C) of the present invention is used, a sufficient curing speed cannot be attained.

TABLE 3

| Components | | Example 20 | Example 21 | Example 22 | Example 23 | Example 24 | Example 25 | Example 26 | Example 27 |
|---|---|---|---|---|---|---|---|---|---|
| (A) | 835LV | 100 | 100 | 100 | 100 | 100 | 100 | 100 | 100 |
| (B) | PTMP | 75 | 75 | 75 | 75 | 75 | 75 | 75 | 75 |
| (C) | UCAT-5002 | 3.38 | 3.38 | 3.38 | 3.38 | 3.38 | 3.38 | 3.38 | 3.38 |
| (D) | dibenzosuberone | 1.25 | | | | | | | |
| | anthraquinone | | 0.21 | | | | | | |
| | 2-ethylanthraquinone | | | 1.42 | | | | | |
| | thioxanthone | | | | 0.21 | | | | |
| | KAYACURE ITX | | | | | 1.53 | | | |
| | KAYACURE DETX-S | | | | | | 1.61 | | |
| | benzophenone | | | | | | | 1.09 | |
| | 4-benzophenone | | | | | | | | 1.18 |
| | SPEEDCURE PBZ | | | | | | | | |
| | SPEEDCURE BMS | | | | | | | | |
| | 4,4-bis (dimethylamino) benzophenone | | | | | | | | |

TABLE 3-continued

| | | | | | | | | |
|---|---|---|---|---|---|---|---|---|
| methyl 2-benzoyl benzoate | | | | | | | | |
| ESACURE 1001 M | | | | | | | | |
| benzyl | | | | | | | | |
| DAROCUR MBF | | | | | | | | |
| Curing time at 90° C. without irradiation of ultraviolet rays (min.) | >300 | >300 | >300 | >300 | >300 | >300 | >300 | >300 |
| Appearance after irradiation of ultraviolet rays once | uncured | uncured | uncured | uncured | uncured | uncured | uncured | uncured |
| Appearance after irradiation of ultraviolet rays twice | uncured | uncured | cured | uncured | cured | uncured | uncured | uncured |
| Curing time at 90° C. after irradiation of ultraviolet rays twice (min.) | 25 | 14 | 0 | 14 | 0 | 1 | 40 | 40 |
| Storage stability at room temperature | >30 days | >30 days | >30 days | >30 days | >30 days | >30 days | >30 days | >30 days |

| | Components | Example 28 | Example 29 | Example 30 | Example 31 | Example 32 | Example 33 | Example 34 |
|---|---|---|---|---|---|---|---|---|
| (A) | 835LV | 100 | 100 | 100 | 100 | 100 | 100 | 100 |
| (B) | PTMP | 75 | 75 | 75 | 75 | 75 | 75 | 75 |
| (C) | UCAT-5002 | 3.38 | 3.38 | 3.38 | 3.38 | 3.38 | 3.38 | 3.38 |
| (D) | dibenzosuberone | | | | | | | |
| | anthraquinone | | | | | | | |
| | 2-ethylanthraquinone | | | | | | | |
| | thioxanthone | | | | | | | |
| | KAYACURE ITX | | | | | | | |
| | KAYACURE DETX-S | | | | | | | |
| | benzophenone | | | | | | | |
| | 4-benzophenone | | | | | | | |
| | SPEEDCURE PBZ | 1.55 | | | | | | |
| | SPEEDCURE BMS | | 1.83 | | | | | |
| | 4,4-bis (dimethylamino) benzophenone | | | 0.32 | | | | |
| | methyl 2-benzoyl benzoate | | | | 1.44 | | | |
| | ESACURE 1001 M | | | | | 1.54 | | |
| | benzyl | | | | | | 1.26 | |
| | DAROCUR MBF | | | | | | | 0.97 |
| | Curing time at 90° C. without irradiation of ultraviolet rays (min.) | >300 | >300 | >300 | >300 | >300 | >300 | >300 |
| | Appearance after irradiation of ultraviolet rays once | uncured | uncured | uncured | uncured | uncured | uncured | uncured |
| | Appearance after irradiation of ultraviolet rays twice | cured | uncured | uncured | uncured | uncured | cured | uncured |
| | Curing time at 90° C. after irradiation of ultraviolet rays twice (min.) | 0 | 1 | 130 | 30 | 10 | 0 | 30 |
| | Storage stability at room temperature | >30 days | >30 days | >30 days | >30 days | >30 days | >30 days | >30 days |

TABLE 4

| | Components | Example 36 | Example 37 | Example 38 | Example 39 | Example 40 | Example 41 | Example 42 | Example 43 | Example 44 |
|---|---|---|---|---|---|---|---|---|---|---|
| (A) | 835LV | 100 | 100 | 100 | 100 | 100 | 100 | 100 | 100 | 100 |
| (B) | PTMP | 75 | 75 | 75 | 75 | 75 | 75 | 75 | 75 | 75 |
| (C) | UCAT-5002 | 3.38 | 3.38 | 3.38 | 3.38 | 3.38 | 3.38 | 3.38 | 3.38 | 3.38 |
| (D) | IRGACURE 651 | 1.54 | | | | | | | | |
| | IRGACURE 1173 | | 0.99 | | | | | | | |
| | IRGACURE 2959 | | | 1.35 | | | | | | |
| | ESACURE One | | | | 2.45 | | | | | |
| | benzoin | | | | | 1.27 | | | | |
| | bensoinisobutyl ether | | | | | | 1.61 | | | |
| | methyl 3-hydroxy-2-naphthoate | | | | | | | 1.21 | | |
| | anthracene | | | | | | | | 0.18 | |
| | UVS 1331 | | | | | | | | | 1.94 |
| | fluoranthene | | | | | | | | | |
| | fluorene | | | | | | | | | |
| | methyl 4-nitrobenzoate | | | | | | | | | |
| | IRGACURE 907 | | | | | | | | | |
| | IRGACURE 369 | | | | | | | | | |
| | IRGACURE OXE-1 | | | | | | | | | |
| | IRGACURE OXE-2 | | | | | | | | | |
| | Rose bengal | | | | | | | | | |
| | Curing time at 90° C. without irradiation of ultraviolet rays (min.) | >300 | >300 | >300 | >300 | >300 | >300 | >300 | >300 | >300 |

TABLE 4-continued

| | | | | | | | | | |
|---|---|---|---|---|---|---|---|---|---|
| Appearance after irradiation of ultraviolet rays once | uncured | uncured | uncured | uncured | uncured | uncured | uncured | uncured | uncured |
| Appearance after irradiation of ultraviolet rays twice | uncured | uncured | uncured | uncured | uncured | uncured | uncured | uncured | uncured |
| Curing time at 90° C. after irradiation of ultraviolet rays twice (min.) | 80 | 100 | 30 | 40 | 60 | 40 | 60 | 26 | 10 |
| Storage stability at room temperature | >30 days | >30 days | >30 days | >30 days | >30 days | >30 days | >30 days | >30 days | >30 days |

| | Components | Example 45 | Example 46 | Example 35 | Example 47 | Example 48 | Example 49 | Example 50 | Example 51 |
|---|---|---|---|---|---|---|---|---|---|
| (A) | 835LV | 100 | 100 | 100 | 100 | 100 | 100 | 100 | 100 |
| (B) | PTMP | 75 | 75 | 75 | 75 | 75 | 75 | 75 | 75 |
| (C) | UCAT-5002 | 3.38 | 3.38 | 3.38 | 3.38 | 3.38 | 3.38 | 3.38 | 3.38 |
| (D) | IRGACURE 651 | | | | | | | | |
| | IRGACURE 1173 | | | | | | | | |
| | IRGACURE 2959 | | | | | | | | |
| | ESACURE One | | | | | | | | |
| | benzoin | | | | | | | | |
| | bensoinisobutyl ether | | | | | | | | |
| | methyl 3-hydroxy-2-naphthoate | | | | | | | | |
| | anthracene | | | | | | | | |
| | UVS 1331 | | | | | | | | |
| | fluoranthene | 1.21 | | | | | | | |
| | fluorene | | 1.00 | | | | | | |
| | methyl 4-nitrobenzoate | | | 1.09 | | | | | |
| | IRGACURE 907 | | | | 1.68 | | | | |
| | IRGACURE 369 | | | | | 2.20 | | | |
| | IRGACURE OXE-1 | | | | | | 2.67 | | |
| | IRGACURE OXE-2 | | | | | | | 2.48 | |
| | Rose bengal | | | | | | | | 1.02 |
| Curing time at 90° C. without irradiation of ultraviolet rays (min.) | | >300 | >300 | >300 | 180 | 240 | >300 | >300 | >300 |
| Appearance after irradiation of ultraviolet rays once | | uncured | uncured | uncured | uncured | uncured | uncured | uncured | uncured |
| Appearance after irradiation of ultraviolet rays twice | | uncured | uncured | uncured | uncured | uncured | uncured | uncured | uncured |
| Curing time at 90° C. after irradiation of ultraviolet rays twice (min.) | | 0 | 30 | 14 | 3 | 5 | 10 | 10 | 70 |
| Storage stability at room temperature | | >30 days | >30 days | >30 days | >30 days | >30 days | >30 days | >30 days | >30 days |

It is found from Examples 20 to 51 in Tables 3 and 4 that arbitrary component (D) can be used in order to improve photo activity.

TABLE 5

| | Components | Example 52 | Example 53 | Example 54 | Example 55 |
|---|---|---|---|---|---|
| (A) | EX411 | 50 | 50 | | |
| | YX8000 | 50 | 50 | | 50 |
| | JER807 | | | 100 | 50 |
| (B) | DPMP | 40 | 100 | | |
| | QX40 | | | 100 | |
| | QX30 | | | | 80 |
| (C) | N3B | 1.5 | 1.5 | | |
| | UCAT-5002 | | | 3 | 1 |
| | NaBPh4 | | | | 2 |
| (D) | SPEEDCURE PBZ | 0.5 | 0.5 | | 1 |
| | 2-ethylanthraquinone | | | 1 | |
| | 9-fluorenone | | | | 1 |
| | Speedcure MBF | | | 2 | |
| (E) | UN-6200 | | | 200 | |
| | EX146 | | | | 10 |
| | L07N | | | | 0.1 |
| | KBM403 | | | | 1 |
| | Aerosil R805 | | | | 3 |
| Curing time at 90° C. without irradiation of ultraviolet rays (min.) | | >300 | >300 | 160 | 260 |
| Appearance after irradiation of ultraviolet rays once | | uncured | uncured | uncured | uncured |

TABLE 5-continued

| Components | Example 52 | Example 53 | Example 54 | Example 55 |
|---|---|---|---|---|
| Appearance after irradiation of ultraviolet rays twice | uncured | cured | uncured | uncured |
| Curing time at 90° C. after irradiation of ultraviolet rays twice (min.) | 24 | 50 | 60 | 80 |
| Storage stability at room temperature | >30 days | >30 days | >30 days | 23 days |

It is found from Examples 52 to 55 in Table 5 that any of the components (A), (B), (C) and (D) can be used by combination of a plurality of these components. It is found from Examples 52 and 53 that there is no problem even when a mixing ratio of the component (A) and the component (B) is changed. It is found from Example 54 that there is no problem even when urethane acrylate is mixed as the component (E). It is found from Example 55 that even when other blending components such as a compound containing one glycidyl group in the molecule, an anion polymerization inhibitor, a coupling agent and a filler are added, the composition can be quickly cured at room temperature or a low heating temperature by irradiating ultraviolet rays, and also has favorable storage stability at room temperature.

It is found from the preparation methods in Examples 1 to 55 and a to f that, as a preparation method of the present composition, there is no problem when a solvent is used and there is also no problem when a heating step is used. It is found that when the compositions are not irradiated with light in Examples 1 to 55 and a to f, the compositions are not cured for a long time even though they are heated at 90° C.

Example 56

Investigation for Adjustment of Curing Speed According to Conditions of Ultraviolet Irradiation The composition of Example 8 was used and measurements of a curing speed and a glass transition point when an ultraviolet accumulated light quantity was changed were carried out using a differential scanning calorimeter (DSC).

Into an aluminum pan for a DSC measurement, 4.0 mg of the composition of Example 8 was separated and irradiated with a 365 nm-active energy ray having an illumination intensity of 100 mW/cm² for 0, 10, 30 and 60 seconds (when converted into accumulated light quantities, the accumulated light quantities were 0, 1, 3, and 6 J/cm², respectively) using a spot ultraviolet radiation apparatus (lamp in use: L8252) manufactured by Hamamatsu Photonics K.K., immediately after that, the container was sealed and the temperature increasing DSC measurement was then carried out in DSC (DSC220 manufactured by Seiko Instruments Inc.) under the conditions of a temperature from 20 to 280° C. and a temperature increasing speed of 10° C./min. After this measurement, the sample was directly cooled, the temperature increasing measurement was performed again at a temperature from −10 to 80° C. at a temperature increasing speed of 10° C./min to measure a glass transition point of the obtained cured product in the first measurement conditions. The reaction initiation temperature and the glass transition point obtained from each measurement were shown in Table 6. FIG. 1 shows the DSC curve of the first measurement.

It is found from Table 6 and FIG. 1 that a curing speed (a curing initiation temperature and a curing time) can be adjusted by changing conditions of ultraviolet irradiation even in the same composition. It is also found that because glass transition points of respective cured products are approximately the same, the obtained cured products have equivalent physical properties regardless of conditions of ultraviolet irradiation or a curing speed. It is also found that the composition of the present invention has an ability to form a cured product having a sufficient glass transition point for using in various applications.

TABLE 6

| Ultraviolet irradiation accumulated light quantity (J/cm²) | Reaction initiation temperature (° C.) | Glass transition point (° C.) |
|---|---|---|
| 0 (No irradiation) | 184.2 | 34.0 |
| 1 | 95.5 | 33.0 |
| 3 | 73.6 | 33.2 |
| 6 | 53.9 | 35.2 |

Example 57

Adjustment of Flowability Before Curing of Composition by Ultraviolet Irradiation The composition of Example 54 was coated on a slide glass with 5 mm-square and a thickness of 0.5 mm and irradiated with a 365 nm-active energy ray having an illumination intensity of 100 mW/cm² using a spot ultraviolet radiation apparatus (lamp in use: L8252) manufactured by Hamamatsu Photonics K.K. and the composition was thus irradiated with ultraviolet rays by a spot ultraviolet radiation apparatus (illumination intensity with 365 nm: 100 mW/cm²) manufactured by Hamamatsu Photonics K.K. for 60 seconds. The composition was gelated after irradiation. When the composition was stood still in a dark place at room temperature, the composition was in a gel state and kept in the same shape even after 8 hours. When another slide glass was laminated on the composition and fixed with a pinch, and left to stand in a constant-temperature furnace at 90° C., the gelated composition quickly became liquid along with temperature increase and spread on the entire surface of the glass adhesion surface to be coated. When heating in the constant-temperature furnace at 90° C. was continued as it is, the composition was cured and solidly adhered after 30 minutes. Thereby, it was shown that one composition of the present invention can be adjusted in flowability and kept in the shape after coating due to irradiation of ultraviolet rays and is effective as an adhesive agent that is cured after becoming liquid again due to subsequent heating.

Example 58

Test of Tensile Shear Adhesion Strength of Member that does not Transmit Energy Ray The composition of Example 8 was thinly coated on a 10 mm-edge of a test piece made of two pieces of iron (SPCC-SD, 25×50×1.6 mm) and irradiated with an energy ray of 5

J/cm² using a conveyer-type ultraviolet radiation apparatus (lamp: UVL-4001-N) manufactured by USHIO INC. Immediately after irradiation, the composition on the coated surface was liquid. A coated surface of the composition of another iron test piece was quickly laminated, fixed with a pinch and left to stand in a constant-temperature furnace at 100° C. When the test piece was taken out after 10 minutes, the composition on the adhesion surface was cured and adhered. The test piece was gradually cooled at room temperature for 2 hours, and a tensile shear adhesion strength measured at a tensile speed of 50 mm/min using a universal tensile tester (Instron) was 11.8 MPa. Accordingly, it is found that even when an adhered member does not transmit an energy ray such as light neither iron does, the composition of the present invention can be solidly adhered in a short time at room temperature or due to heating by laminating after irradiation of energy. It is also found that a curing time can be adjusted by an atmospheric temperature.

INDUSTRIAL APPLICABILITY

The present invention relates to a novel curable composition containing an epoxy resin as the main component, which can be quickly cured at room temperature or a low heating temperature by irradiation of an active energy ray such as light and electron rays, and a method of curing the curable composition and a cured product. The present invention can be widely applied particularly to potting, molding, coating, an adhesive agent, a sealing agent, and photolithography, photoprinting, various resist materials, and the like.

The invention claimed is:
1. A curable composition comprising components (A) to (C) described below:
the component (A) being a compound having 2 or more glycidyl groups in the molecule thereof;
the component (B) being a compound having 2 or more thiol groups in the molecule thereof; and
the component (C) being a photobase generating agent comprising a salt having an anion expressed by the following general formula (1);

[Chemical Formula 1]

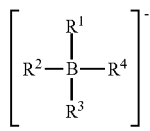

wherein R¹ to R⁴ each represents a hydrogen atom, a halogen atom, a substituted or unsubstituted aromatic group, or a substituted or un substituted alkyl group having 1 to 20 carbon atoms, and may be the same or different one another.
2. The curable composition according to claim 1, further comprising a photosensitizing agent (D).
3. The curable composition according to claim 1, wherein the component (C) comprises a salt expressed by the general formula (2) or (3) described below:

[Chemical Formula (2)]

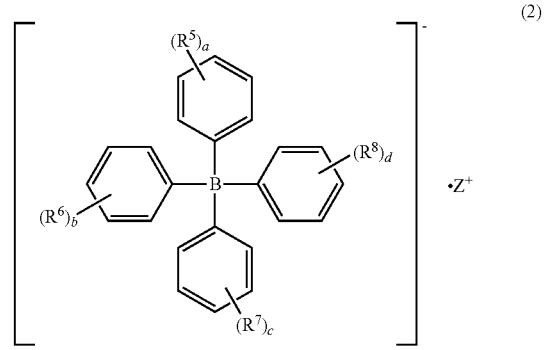

wherein R⁵ to R⁸ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group, an aldehyde group, an amino group, an imino group, an amide group (—CONR$^p$R$^q$), an imide group (—CONR$^p$COR$^q$), a cyano group, a sulfonic acid group (—SO₃H), a sulfonyl group (—SO₂R$^p$), a nitro group, a sulfide group (—S—R$^p$), a thiol group or an isocyanate group singly or a group obtained by combining a plurality of any of these groups (herein R$^p$ and R$^q$ each independently represents a substituted or unsubstituted alkyl group having 1 to 20 carbon atoms or a substituted or unsubstituted aryl group having 6 to 20 carbon atoms), a, b, c and d each independently represents an integer of 0 to 4, and Z⁺ represents a quaternary ammonium cation, an alkali metal cation or a phosphonium cation; and

[Chemical formula 3]

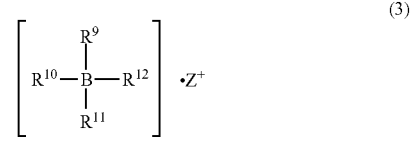

wherein R⁹ to R¹¹ each represents a substituted or unsubstituted aromatic group, R¹² represents an alkyl group having 1 to 20 carbon atoms, and Z⁺ represents a quaternary ammonium cation, an alkali metal cation or a phosphonium cation.
4. The curable composition according to claim 3, wherein the quaternary ammonium cation of Z⁺ is selected from the group consisting of cations each having one or more structures of 1,8-diazabicyclo[5.4.0]undeca-7-ene, 1,5-diazabicyclo[4.3.0] nona-5-ene, triazabicyclodecene, hexahydromethylpyrimidopyrimidine and tetra n-butyl ammonium, in the molecule thereof,
the alkali metal cation of Z⁺ is selected from the group consisting of a sodium cation, a potassium cation and a lithium cation, and
the phosphonium cation of Z⁺ is a compound expressed by the general formula (4) described below:

[Chemical Formula 4]

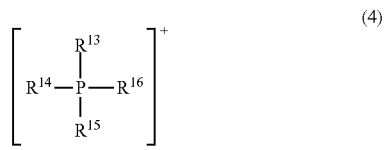
(4)

wherein $R^{13}$ to $R^{16}$ each represents a hydrogen atom, a halogen atom, a substituted or unsubstituted aromatic group or a substituted or unsubstituted alkyl group having 1 to 20 carbon atoms, and may be the same or different one another.

5. The curable composition according to claim 2, wherein the component (D) is selected from:
   a compound that is selected from the group consisting of compounds expressed by the general formulae (5) to (8);
   a radical polymerization initiator that is selected from the group consisting of a benzyl ketal-based photoradical polymerization initiator, an α-hydroxyacetophenone-based photoradical polymerization initiator, a benzoin-based photoradical polymerization initiator, an aminoacetophenone-based photoinitiator, an oxime ketone-based photoradical polymerization initiator, an acylphosphine oxide-based photoradical polymerization initiator, and the general formula (9);
   an aromatic hydrocarbon that is selected from the group consisting of a naphthalene derivative and an anthracene derivative; a nitro compound that is selected from the group consisting of a nitrobenzoic acid and nitroaniline; and
   a dye that is selected from the group consisting of riboflavin, rose bengal, eosin, erythrosine, methylene blue and new methylene blue rose;

[Chemical Formula 5]

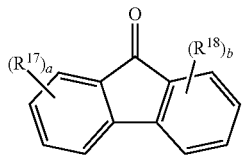
(5)

wherein $R^{17}$ and $R^{18}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group, an aldehyde group, an amino group, an imino group, an amide group (—CONR$^p$R$^q$), an imide group (—CONR$^p$COR$^q$), a cyano group, a sulfonic acid group (—SO$_3$H), a sulfonyl group (—SO$_2$R$^p$), a nitro group, a sulfide group (—S—R$^p$), a thiol group, and an isocyanate group singly or a group obtained by combining a plurality of any of these groups (herein, R$^p$ and R$^q$ each independently represents a substituted or unsubstituted alkyl group having 1 to 20 carbon atoms or a substituted or unsubstituted aryl group having 6 to 20 carbon atoms), and a and b each independently represents an integer of 0 to 4;

[Chemical Formula 6]

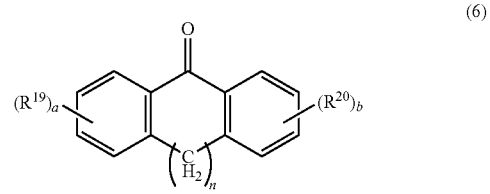
(6)

wherein n represents an integer of 1 to 12, $R^{19}$ and $R^{20}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group, an aldehyde group, an amino group, an imino group, an amide group (—CONR$^p$R$^q$), an imide group (—CONR$^p$COR$^q$), a cyano group, a sulfonic acid group (—SO$_3$H), a sulfonyl group (—SO$_2$R$^p$), a nitro group, a sulfide group (—S—R$^p$), a thiol group, and an isocyanate group singly or a group obtained by combining a plurality of any of these groups (herein, R$^p$ and R$^q$ each independently represents a substituted or unsubstituted alkyl group having 1 to 20 carbon atoms or a substituted or unsubstituted aryl group having 6 to 20 carbon atoms), and a and b each independently represents an integer of 0 to 4;

[Chemical Formula 7]

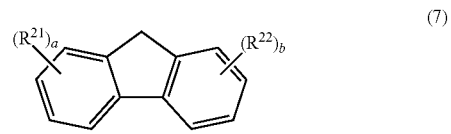
(7)

wherein $R^{21}$ and $R^{22}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COOR$^p$), a carboxyl group, an aldehyde group, an amino group, an imino group, an amide group (—CONR$^p$R$^q$), an imide group (—CONR$^p$COR$^q$), a cyano group, a sulfonic acid group (—SO$_3$H), a sulfonyl group (—SO$_2$R$^p$), a nitro group, a sulfide group (—S—R$^p$), a thiol group, and an isocyanate group singly or a group obtained by combining a plurality of any of these groups (herein, R$^p$ and R$^q$ each independently represents a substituted or unsubstituted alkyl group having 1 to 20 carbon atoms or a substituted or unsubstituted aryl group having 6 to 20 carbon atoms), and a and b each independently represents an integer of 0 to 4;

[Chemical Formula 8]

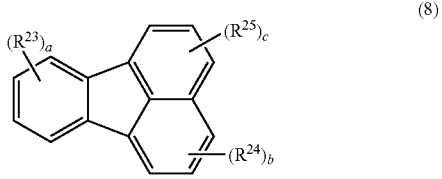
(8)

wherein $R^{23}$ to $R^{25}$ each represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COO$R^p$), a carboxyl group, an aldehyde group, an amino group, an imino group, an amide group (—CON$R^p R^q$), an imide group (—CON$R^p$CO$R^q$), a cyano group, a sulfonic acid group (—SO$_3$H), a sulfonyl group (—SO$_2 R^p$), a nitro group, a sulfide group, a thiol group, and an isocyanate group singly or a group obtained by combining a plurality of any of these groups (herein, $R^p$ and $R^q$ each independently represents a substituted or unsubstituted alkyl group having 1 to 20 carbon atoms or a substituted or unsubstituted aryl group having 6 to 20 carbon atoms), and a represents an integer of 0 to 4, and b and c each independently represents an integer of 0 to 3; and

[Chemical Formula 9]

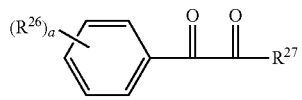

(9)

wherein $R^{26}$ and $R^{27}$ each independently represents a hydrogen atom, a halogen atom, a hydroxy group, a linear or branched alkyl group having 1 to 20 carbon atoms, a cycloalkyl group having 3 to 20 carbon atoms, an aryl group having 6 to 20 carbon atoms, an alkoxy group having 1 to 20 carbon atoms, an ester group (—COO$R^p$), a carboxyl group, an aldehyde group, an amino group, an imino group, an amide group (—CON$R^p R^q$), an imide group (—CON$R^p$CO$R^q$), a cyano group, a sulfonic acid group (—SO$_3$H), a sulfonyl group (—SO$_2 R^p$), a nitro group, a sulfide group, a thiol group, and an isocyanate group singly or a group obtained by combining a plurality of any of these groups (herein, $R^p$ and $R^q$ each independently represents a substituted or unsubstituted alkyl group having 1 to 20 carbon atoms or a substituted or unsubstituted aryl group having 6 to 20 carbon atoms), and a each independently represents an integer of 0 to 5.

6. The curable composition according to claim 2, further comprising a compound (E) that contains one or more radical polymerizable groups in the molecule thereof.

7. A curing method comprising:
irradiating an active energy ray having a wavelength of 150 to 830 nm on the curable composition set forth in claim 1; thereafter
curing the curable composition at room temperature or in a heating environment.

* * * * *